United States Patent
Mori et al.

(10) Patent No.: US 6,460,242 B1
(45) Date of Patent: Oct. 8, 2002

(54) INERTIA PRESS FITTING METHOD

(75) Inventors: Hideo Mori; Shigemi Shioya, both of Okazaki; Kouki Endoh, Nissin; Masaki Nakaoka, Toyota; Hiroyuki Takeuchi, Okazaki; Michiya Inui, Toyota, all of (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/647,611

(22) PCT Filed: Apr. 2, 1999

(86) PCT No.: PCT/JP99/01782

§ 371 (c)(1), (2), (4) Date: Oct. 3, 2000

(87) PCT Pub. No.: WO99/54084

PCT Pub. Date: Oct. 28, 1999

(30) Foreign Application Priority Data

| Apr. 23, 1998 | (JP) | 10-113740 |
| May 15, 1998 | (JP) | 10-133830 |
| Sep. 8, 1998 | (JP) | 10-254207 |

(51) Int. Cl.$^7$ .............................. B23P 19/02
(52) U.S. Cl. ................ 29/505; 29/525; 29/522.1; 29/451; 29/423; 72/56; 403/279; 403/280; 403/282
(58) Field of Search ............... 29/421.1, 421.2, 29/525, 423, 522.1, 450, 451, 505; 228/113; 72/56, 430; 403/279, 280, 282

(56) References Cited

U.S. PATENT DOCUMENTS

| 886,515 A | * | 5/1908 | Jude |
| 3,680,997 A | * | 8/1972 | Linthout |
| 4,425,699 A | * | 1/1984 | Nordin |
| 5,388,677 A | * | 2/1995 | Rosch |
| 5,875,953 A | | 3/1999 | Shioya |

FOREIGN PATENT DOCUMENTS

| JP | 8-52625 | | 2/1996 |
| JP | 9-66421 | | 3/1997 |
| JP | 11-033839 | * | 2/1999 |
| JP | 2000-042845 | * | 2/2000 |

* cited by examiner

*Primary Examiner*—S. Thomas Hughes
*Assistant Examiner*—Eric Compton
(74) *Attorney, Agent, or Firm*—Finnegan, Henderson, Farabow, Garrett & Dunner, L.L.P.

(57) ABSTRACT

In an inertia-press-fit method in which a kinetic energy is applied to at least one of two members in a direction which causes the two members to approach each other, and the two members are press-fitted with each other, an end surface 80 of the first member 10 and a bottom surface 82 of the second member 12 are caused, for stabilizing a relative position of the two members at a time when the press-fitting ends, to butt each other to define the relative position of the two members 10, 12 at the time when the press-fitting ends and, immediately after the butting, at least one of the two members 10, 12 is caused to plastically deform and thereby absorb a remaining kinetic energy of the one of the two members. Thus, the relative position of the two members 10, 12 when the press-fitting ends is stabilized. In the case where respective plastic-deformation capabilities of the two members 10, 12 are great, a maximal value occurs to a graph whose axis of abscissa represents kinetic energy and whose axis of ordinate represents amount of deviation of relative position of the two members. If the respective plastic-deformation capabilities of the two members 10, 12 are so chosen as to decrease the maximal value, then the amount of deviation of the relative position is decreased even though the accuracy of control of the applied amount of kinetic energy may be low.

23 Claims, 13 Drawing Sheets

FIG. 13
(a)
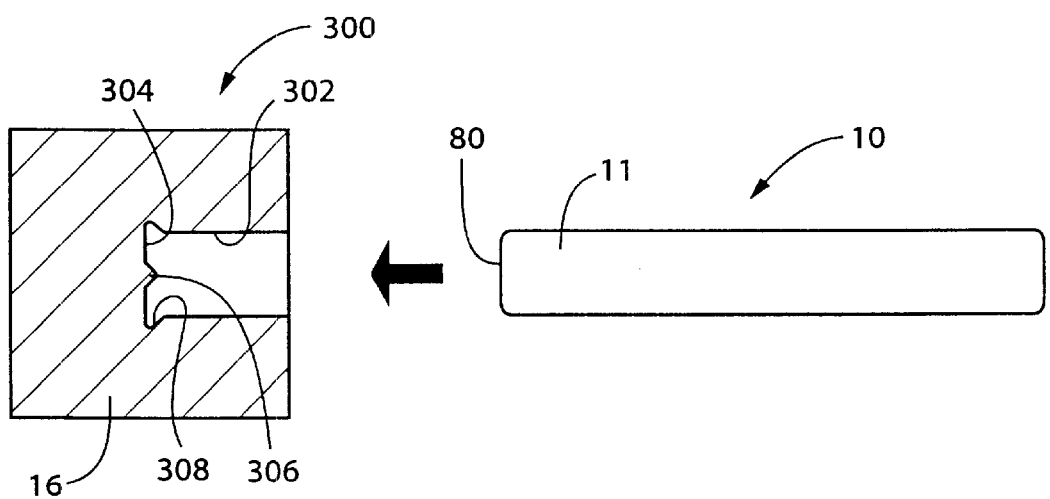
(b)
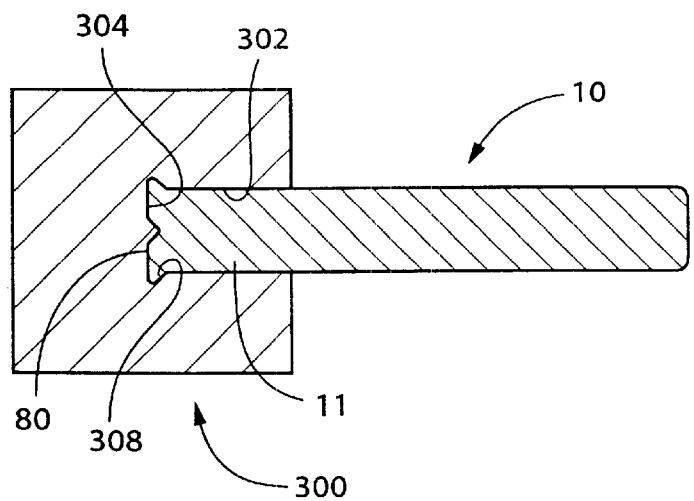

FIG. 14
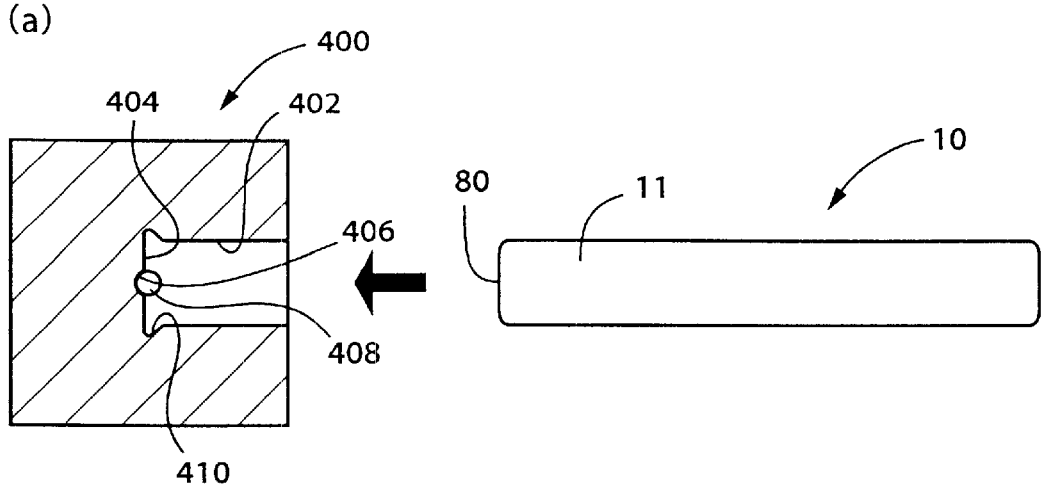
(a)
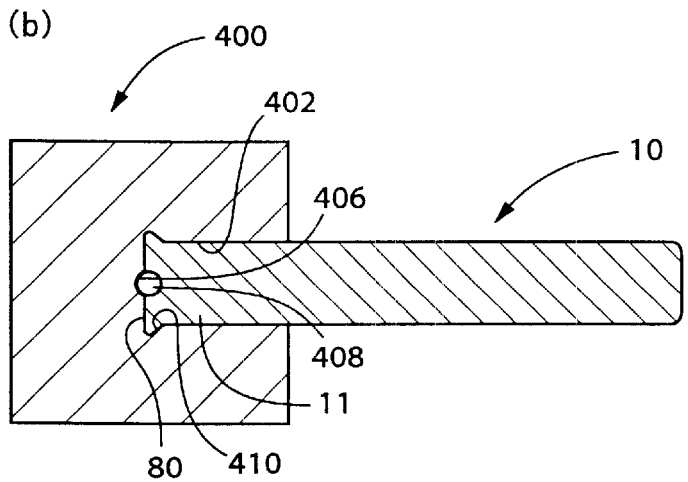
(b)

INERTIA PRESS FITTING METHOD

TECHNICAL FIELD

The present invention relates to the art of press-fitting two members with each other and particularly to the art of applying a kinetic energy to at least one of two members in a direction which causes the two members to approach each other, and thereby press-fitting the two members with each other.

BACKGROUND ART

The above-indicated press-fit art is the art of utilizing inertia of at least one of two members and press-fitting the two members with each other by impact thereof, and is disclosed in Japanese Patent Application laid open under Publication No. 9-66421.

DISCLOSURE OF INVENTION

Generally, the inertia-press-fit art requires the art of stabilizing a relative position of two members at a time when the press-fitting of the two members ends (hereinafter, referred to simply as the "press-fit-end position"). To meet this requirement, the present inventors had proposed, in the inertia-press-fit art, the art of defining the press-fit-end position of two members by causing the two members to butt each other.

However, if, in the above-indicated art, at least one of the two members has a remaining kinetic energy immediately after the butting of the two members, the two members are rebounded from each other, so that an actual press-fit-end position of the two members is deviated from a normal position.

The present invention has been developed in the above-indicated background, and an object thereof is to provide an inertia-press-fit method which can sufficiently stabilize the press-fit-end position of two members.

The above-indicated object is achieved according to each of the following features of the present invention. Those features are given respective sequential numbers and are described, as needed, in the same manner as that in which claims are described, i.e., any feature that includes another feature shall do so by referring to the number given to the latter feature. This is for helping more easily understand that two or more of the following features may be combined. It is to be understood that the technical features, and the combinations thereof, described in the present specification are not limited to the following features and the combinations thereof.

(1) An inertia-press-fit method of applying a kinetic energy to at least one of two members in a direction which causes the two members to approach each other, and press-fitting the two members with each other, characterized by
causing the two members to butt each other to define a relative position of the two members at a time when the press-fitting ends and, immediately after the butting, causing at least one of the two members to plastically deform and thereby absorb a remaining kinetic energy of the one member.

In the present method, the remaining kinetic energy of the one member (to which the kinetic energy had been applied), at a time immediate after the butting of the two members, is absorbed into plastic-deformation energy by at least one of the two members. Therefore, in the present method, even if at least one of the two members may have a remaining kinetic energy immediately after the butting of the two members, an actual press-fit-end position of the two members is not largely deviated from a normal position.

Each of the two members may be provided by a single part or by an assembly consisting of a plurality of parts. In the latter case, the plurality of parts may include such a part which is used exclusively when the press-fitting is performed. The latter part may be a buffer member which, immediately after one of the two members to which the buffer member belongs butts the other member, plastically deforms and thereby absorbs the kinetic energy (i.e., excessive kinetic energy) which remains immediately after the butting.

(2) An inertia-press-fit method according to the feature (1), wherein at least one of the two members includes a butting portion which butts the other member, and an interference-fitting portion which interference-fits with the other member, the butting portion being more plastically deformable than the interference-fitting portion.

In this method, the butting portion contributes to absorbing the kinetic energy which remains immediately after the butting, thereby stabilizing the press-fit-end position of the two members. In addition, since the interference-fitting portion provides an anchoring effect by mechanically engaging the other member, the two members are bonded with each other with an increased strength.

(3) An inertia-press-fit method according to the feature (2), wherein the butting portion of the at least one of the two members has a Vickers hardness Hv smaller than that of the interference-fitting portion thereof.

Generally, hardness of a material has a positive correlation with yield stress. More specifically described, as hardness decreases, yield stress also decreases. As yield stress of a material decreases, the material is more likely to plastically deform and thereby absorb an external energy into plastic-deformation energy. Therefore, a material with a lower hardness is more likely to absorb an external energy. In addition, hardness of a material has a positive correlation with coefficient of rebound. More specifically described, as hardness decreases, coefficient of rebound decreases. As coefficient of rebound of a material decreases, amount of rebound of the material upon butting on another member decreases. Meanwhile, there are various hardness measuring methods one of which is known as Vickers harness. Based on those knowledges, the method according to the present feature (3) has been developed as one embodiment of the method according to the feature (2).

(4) An inertia-press-fit method according to any one of the features (1) to (3), wherein the two members include respective butting portions which butt each other, at least one of the butting portions having a shape which allows a material thereof to flow and thus plastically deform.

In the present method, the shape factor of at least one of the two butting portions assures the plastic deformation, which leads to absorbing efficiently the excessive kinetic energy immediate after the butting.

(5) An inertia-press-fit method according to any one of the features (1) to (4), wherein the two members are caused to butt each other at a stopper surface inclined relative to a plane perpendicular to the direction, to define the relative position of the two members at the time when the press-fitting ends.

In the case where the press-fit-end position of the two members are defined by causing the two members to butt each other at a stopper surface perpendicular to the direction in which the two members approach each other, a rebounding force whose magnitude is equal to that of the excessive force acting from one member to the other member immediately after the butting, acts from the other member to the one member in a direction opposite to the direction in which the excessive force acts. In contrast, in the case where the press-fit-end position of the two members are defined by causing the two members to butt each other at a stopper surface inclined relative to a plane perpendicular to the direction in which the two members approach each other, a rebounding force whose magnitude is smaller than that of the excessive force acting from one member to the other member immediately after the butting, acts from the other member to the one member in the direction opposite to the direction in which the excessive force acts. Thus, under the condition that the excessive force is same in the two cases, the rebounding force received, in the latter case, by the one member from the other member immediately after the butting is smaller than that received in the former case by the one member, so that the distance by which the one member is rebounded, in the latter case, from the other member with the excessive force immediate after the butting is smaller than that in the former case.

Based on the above-indicated knowledges, in the method according to the present feature, the press-fit-end position of the two members are defined by causing the two members to butt each other at the stopper surface inclined relative to the plane perpendicular to the direction in which the two members approach each other. Therefore, the present method assures that, if the kinetic energy remains immediately after the butting, the press-fit-end position of the two members is also stabilized by the mechanism that the rebounding force is decreased by the shape factor of at least one of the two members.

(6) An inertia-press-fit method according to any one of the features (1) to (5), wherein one of the two members is a torsion bar which is used in a power steering device of an automotive vehicle and the other member is a shaft which is used in the power steering device and which is press-fitted in the torsion bar, and wherein the torsion bar includes a butting portion which butts the shaft and which has a Vickers hardness Hv not greater than about 450 and the shaft includes a butting portion which butts the torsion bar and which has a Vickers hardness Hv not greater than about 300.

The present inventors had conducted an experiment on the two members one of which is a torsion bar which is used in a power steering device of an automotive vehicle and the other of which is a shaft which is also used in the power steering device and which is press-fitted in the torsion bar. The experiment results show, as will be described in detail later, that in the case where the torsion bar includes a butting portion which butts the shaft and which has a Vickers hardness Hv not greater than about 450 and the shaft includes a butting portion which butts the torsion bar and which has a Vickers hardness Hv not greater than about 300, the amount of rebound of the two members is effectively decreased. Based on those knowledges, the method according to the present feature has been developed.

(7) An inertia-press-fit method according to any one of the features (1) to (5), wherein at least one of the two members includes a butting portion which butts the other member and which has a Vickers hardness Hv not greater than about 450.

(8) An inertia-press-fit method according to any one of the features (1) to (5), wherein at least one of the two members includes a butting portion which butts the other member and which has a Vickers hardness Hv not greater than about 400.

(9) An inertia-press-fit method according to any one of the features (1) to (5), wherein at least one of the two members includes a butting portion which butts the other member and which has a Vickers hardness Hv not greater than about 350.

(10) An inertia-press-fit method according to any one of the features (1) to (5), wherein at least one of the two members includes a butting portion which butts the other member and which has a Vickers hardness Hv not greater than about 300.

(11) An inertia-press-fit method according to any one of the features (1) to (10), wherein one of the two members includes a fitting recessed portion having a fitting hole with a bottom surface and the other member includes a fitting projecting portion which is interference-fitted in the fitting hole, and wherein the fitting projecting portion is press-fitted in the fitting hole to butt the bottom surface thereof.

According to the present feature, a portion of the fitting recessed portion that provides the bottom surface of the fitting hole and an end portion of the fitting projecting portion are utilized as respective butting portions of the two members. Thus, the two members need not be formed with respective exclusive butting portions such as stepped portions, flanges, etc.

(12) An inertia-press-fit method according to the feature (11), wherein the fitting projecting portion has an end surface and a projection which projects from the end surface and which has a diameter smaller than that of the fitting projecting portion, and wherein the projection is caused to butt the bottom surface of the fitting hole.

Thus, the projection whose diameter is smaller than that of the fitting projecting portion is caused to butt the bottom surface of the fitting hole. Since the area of butting of the projection and the bottom surface of the fitting hole is small, at least one of the projection and the bottom surface is likely to plastically deform. In addition, since a compressing force is transmitted via the projection to a central portion of the fitting projecting portion and accordingly the central portion is plastically deformed, the diameter of the fitting projecting portion increases, which leads to increasing substantially a press-fit dimension (i.e., interference-fit dimension) of the fitting projecting portion with respect to the fitting recessed portion, thereby increasing a strength with which the projecting and recessed portions are bonded with each other. This effect is very significant in the case where the hardness of the central portion of the fitting projecting portion is lower than that of an outer peripheral portion thereof. However, according to each of the features (1) to (11) and (15) to (21), it is not essentially required that the end surface of the fitting projecting portion have the projection whose diameter is smaller than that of the projecting portion. For example, if the plastic deformation of the end portion of the fitting projecting portion and/or the bottom portion of the fitting recessed portion results in absorbing sufficiently the excessive energy and thereby decreasing or preventing the rebounding, it is not needed to provide the projection.

(13) An inertia-press-fit method according to the feature (12), wherein the bottom surface of the fitting recessed portion has a recess formed in a central portion thereof, and wherein an outer peripheral portion of the projection is caused to butt a portion of the bottom surface that surrounds the recess.

Since the recess does not butt the projection, the area of butting of the projection and the bottom surface decreases as such, which contributes to causing the plastic deformation to occur more easily.

(14) An inertia-press-fit method according to the feature (12), wherein the bottom surface of the fitting recessed portion has a conical recess formed in a central portion thereof, and wherein an outer peripheral portion of the projection is caused to butt a conical surface of the conical recess.

When the outer peripheral portion of the projection butts the conical surface of the conical recess, the outer portion bites into the conical surface while the outer portion itself plastically deforms on one hand and it plastically deforms, on the other hand, a portion of the bottom surface that defines the conical surface. This is an anchoring effect, which leads to increasing the strength with which the two members are bonded with each other. The outer peripheral portion of the projection may be chamfered, and the chamfered surface may be caused to butt the conical surface. Alternatively, a non-chamfered, angular outer peripheral portion of the projection may be caused to butt the conical surface. However, in the latter case, it is preferred that the projection and/or the conical surface be not formed of a brittle material such as cast iron.

(15) An inertia-press-fit method according to any one of the features (1) to (14), wherein the plastic deformation is caused such that a maximal value of a rebound-caused deviation amount of an actual press-fit-end position from a normal press-fit-end position where the two members are in close contact with each other is not greater than a reference amount (i.e., the upper-limit value of a permissible range).

As will be described in detail in connection with the preferred embodiments of the invention, when at least one of respective butting portions of the two members that butt each other plastically deforms, the rebound amount (i.e., the deviation amount of the actual press-fit-end position from the normal press-fit-end position) increases once as the kinetic energy applied to at least one of the two members increases. However, as the kinetic energy further increases, the rebound amount decreases and eventually takes a negative value. That is, from the state in which respective butting surfaces of the two members are in close contact with each other, the two members are further deeply press-fitted with each other so that the deviation amount of the actual press-fit-end position from the normal press-fit-end position takes a negative value. Thus, the rebound amount takes a maximal point in a graph whose axis of abscissa represents kinetic energy and whose axis of ordinate represents rebound amount. The greater the plastic-deformation capabilities of the respective butting portions of the two members are, the smaller the maximal value is. Therefore, if the sum of the respective plastic-deformation capabilities of the respective butting portions of the two members is not smaller than a reference value, the maximal value of the rebound amount can fall within a permissible range. In this case, even if the kinetic energy applied may vary in a wide range, a fit length of the two members can fall within a permissible range. This is achieved according to the present feature. Thus, the application of the kinetic energy can be easily controlled and accordingly the production cost can be reduced. According to the present feature, it is preferred that the maximal value of the deviation amount be not greater than 0.5 mm, more preferably not greater than 0.3 mm, and most preferably not greater than 0.2 mm. In addition, it is preferred that each of the present feature (15) and the following features (16) to (18) be combined with a feature wherein a projection projects from an end surface of the fitting projecting portion.

(16) An inertia-press-fit method according to any one of the features (1) to (15), wherein one of the two members includes a fitting recessed portion and the other member includes a fitting projecting portion which is press-fitted in the fitting recessed portion, at least the fitting projecting portion being subjected to the plastic deformation, and wherein the two members are press-fitted with each other in a deviation-amount-increase-rate decrease range in which a rate of increase of a rebound-caused deviation amount of an actual press-fit-end position from a reference press-fit-end position where the two members are in close contact with each other decreases as the kinetic energy increases.

As described above, the rebound-caused deviation amount of the press-fit-end position is closely related to the plastic deformation of the respective butting portions of the two members. When the deviation amount falls in the deviation-amount-increase-rate decrease range, the fitting projecting portion substantially plastically deforms, which leads to increasing substantially the strength with which the two members are bonded with each other. The two-member-bonding-strength increasing effect according to each of the features (16) to (18) may be obtained in addition to the press-fit-end-position stabilizing effect (under the condition that the two effects can be simultaneously obtained), or may be obtained independent of the latter effect.

(17) An inertia-press-fit method according to any one of the features (1) to (15), wherein one of the two members includes a fitting recessed portion and the other member includes a fitting projecting portion which is press-fitted in the fitting recessed portion, at least the fitting projecting portion being subjected to the plastic deformation, and wherein the two members are press-fitted with each other in a deviation-amount decrease range in which a rebound-caused deviation amount of an actual press-fit-end position from a normal press-fit-end position where the two members are in close contact with each other decreases as the kinetic energy increases.

In the deviation-amount decrease range, a more significant bonding-strength increasing effect can be obtained.

(18) An inertia-press-fit method according to the feature (17), wherein the two members are press-fitted with each other in the deviation-amount decrease range and simultaneously in a range in which the rebound-caused deviation amount is not greater than a reference amount.

According to the present feature, it is possible to obtain both the bonding-strength increasing effect owing to the plastic deformation and the fit-length stabilizing effect. Even if the maximal value of the deviation amount may be greater than the reference amount, the deviation amount may be smaller, in respective ranges on both sides of the maximal point, than the reference amount. That is, the deviation amount can be controlled to an amount not greater than the reference amount, by controlling the kinetic energy to be applied, to a value belonging to either one of the above two ranges. On the other hand, the bonding-strength increasing effect owing to the plastic deformation of the fitting projecting portion can be obtained in any portion of a kinetic-energy range greater than the maximal point and yet with a sufficiently high degree. However, in a kinetic-energy range smaller than the maximal point, the same effect may, or may not, be obtained.

(19) An inertia-press-fit method of applying a kinetic energy to at least one of two members in a direction which causes the two members to approach each other, and press-fitting the two members with each other, characterized by causing the two members to butt each other via a buffer member to define a relative position of the two members at a time when the press-fitting ends and, immediately after the butting of the two members via the buffer member, causing the buffer member to plastically deform and thereby absorb a remaining kinetic energy of the one member.

In the present method, the kinetic energy which remains on at least one of the two members immediately after the butting of the two members via the buffer member, is absorbed into plastic-deformation energy by the buffer member. Therefore, in the present method, even if the kinetic energy may remain immediately after the butting of the two members via the buffer member, an actual press-fit-end position is not largely deviated from a normal position.

In addition, in the present method, the energy-absorbing characteristic of the buffer member can be designed independent of respective natures of respective materials of the two members, the excessive energy can be effectively absorbed without needing to limiting the natures of materials of the two members.

The present feature wherein the energy-absorbing characteristic of the buffer member is utilized may be combined with the features (15) to (18) in each of which the elastic deformation of the respective butting portions of the two members is utilized. The following two features are representatives of those features.

(20) An inertia-press-fit method according to the feature (19), wherein the plastic deformation is caused such that a maximal value of a rebound-caused deviation amount of an actual press-fit-end position from a normal press-fit-end position where the two members are in close contact with each other is not greater than a reference amount (i.e., the upper-limit value of a permissible range).

(21) An inertia-press-fit method according to the feature (19) or (20), wherein one of the two members includes a fitting recessed portion and the other member includes a fitting projecting portion which is press-fitted in the fitting recessed portion, the buffer member having an outer diameter smaller than that of the fitting projecting portion, and wherein the two members are press-fitted with each other in a deviation-amount decrease range in which a rebound-caused deviation amount of an actual press-fit-end position from a normal press-fit-end position where the two members are in close contact with each other decreases as the kinetic energy increases.

The buffer member operates like the above-indicated projection formed on the end surface of the fitting projecting portion, and the projecting portion plastically deforms to increase the bonding-strength increasing effect.

(22) An inertia-press-fit method according to any one of the features (1), (2), (4), (11), and (15) to (18), wherein, at at least an initial phase of the butting of the two members, a butting projection and a butting portion which is less harder than the butting projection butt each other, so that the butting projection bites into the butting portion.

According to the present feature, at at least the initial phase of the butting of the two members, a butting projection which is provided as part of one of the two members and a butting portion which is provided as part of the other member butt each other, so that the butting projection bites into the butting portion that is less harder than the butting projection. Consequently, the butting portion is plastically deformed so that at least a portion of the kinetic energy which remains on at least one of the two members is absorbed. In the present method, even if some kinetic energy may remain on at least one of the two members at the initial phase of the butting of the two members, an actual press-fit-end position is not largely deviated from a normal position.

(23) An inertia-press-fit method according to the feature (22), wherein one of the two members includes a fitting recessed portion having a fitting hole with a bottom surface and the other member includes a fitting projecting portion which is interference-fitted in the fitting hole, and wherein the butting projection comprises a butting projection projecting from a portion of the bottom surface of the fitting hole and the butting portion comprises an end surface of the fitting projecting portion.

Since the butting projection projects from a portion of the bottom surface of the fitting hole, the area of butting of the butting projection with the end surface of the fitting projecting portion as the butting portion is small as compared with the case where the entire bottom surface of the fitting hole and the entire end surface of the projecting portion butt each other. Thus, the plastic deformation more easily occurs. In addition, since the end portion of the fitting projecting portion plastically deforms, the external dimension of the projecting portion increases so that the press-fit dimension (i.e., interference-fit dimension) of the projecting portion with respect to the recessed portion substantially increases. Therefore, the strength with which the projecting and recessed portions are bonded with each other is increased.

(24) An inertia-press-fit method according to the feature (22), wherein one of the two members includes a fitting recessed portion having a fitting hole with a bottom surface and the other member includes a fitting projecting portion which is interference-fitted in the fitting hole, and wherein the butting projection comprises a hard member which is provided between the bottom surface of the fitting hole and an end surface of the fitting projecting portion and which is harder than at least one of the bottom surface and the end surface.

The present feature is preferably employed in the case where it is difficult, in view of structure or material, to form a projection projecting from the bottom surface of the fitting hole or the end surface of the fitting projecting portion, or increase the hardness of the bottom surface or the end surface. Since the butting projection is provided by the hard member provided between the bottom surface or the end surface, the degree of freedom regarding the selection of respective materials of the two members and/or the determination of hardness difference of the hard member and at least one of the two members, is increased. The hard member may be temporarily attached, by adhesion, sticking, soldering, etc., to one of the two members that is kept still, or may be strongly fixed, by, e.g., blazing, to either one of the two members. Alternatively, depending upon the shape of the hard member, the hard member may be held in a holding hole which is formed in one of the two members. In the case where the holding hole has a shape which can stably hold the hard member, the above-indicated temporary attaching or the fixing blazing may be omitted.

(25) An inertia-press-fit method according to the feature (24), wherein the hard member is a steel ball.

According to the present feature, the hard member can be easily provided by a cheap and highly hard member. In the case where a commercially available steel ball is used, the cost is more largely reduced.

(26) An inertia-press-fit method according to any one of the features (23) to (26), wherein the fitting recessed portion has an undercut which is formed in a portion of an inner circumferential surface of the fitting hole that is near the bottom surface, and whose diameter is greater than that of a remaining portion of the inner circumferential surface, and wherein when the butting projection bites into the end surface of the fitting projecting portion, an end portion of the fitting projecting portion is forced to expand outward and thereby engage the undercut of the fitting recessed portion.

In the present method, the material of the end portion of the fitting projecting portion that is expanded outward by the butting projection is allowed, by the undercut, to flow. Thus, the end portion of the fitting projecting portion is more easily plastically deformed, and the excessive energy at the initial phase of the butting is effectively absorbed. In addition, since the outward expanded portion of the fitting projecting portion engages the undercut, the fitting projecting portion is effectively prevented from coming off the fitting recessed portion, and the strength with which the two members are bonded with each other is increased. The undercut may be provided in the form of a full-annular groove, or a partly formed recess such as a petal-like recess.

(27) An inertia-press-fit method according to the feature (22), wherein one of the two members includes a fitting recessed portion having a fitting hole with a bottom surface and the other member includes a fitting projecting portion which is interference-fitted in the fitting hole, and wherein the butting projection comprises a butting projection projecting from a portion of an end surface of the fitting projecting portion and the butting portion comprises the bottom surface of the fitting hole, the butting projection being caused to bite into the bottom surface of the fitting hole.

According to the present feature, at least a portion of the kinetic energy which remains at the initial phase of the butting is absorbed by the plastic deformation of the bottom surface of the fitting recessed portion, so that the press-fit-end position of the two members is stabilized.

(28) An inertia-press-fit method of applying a kinetic energy to at least one of two members in a direction which causes the two members to approach each other, and press-fitting the two members with each other, characterized in that one of the two members includes a fitting recessed portion having a fitting through-hole, the other member includes a fitting projecting portion which is interference-fitted in the fitting through-hole, and, in a state in which a third member is inserted in the fitting through-hole to an intermediate position thereof from one of two end openings thereof that is opposite to the other end opening in which the fitting projecting portion is to be press-fitted, the fitting projecting portion is press-fitted in the fitting through-hole to butt the third member.

Since the fitting recessed portion has the fitting through-hole, the third member can be used to define the press-fit-end position of the two members. Since, in the state in which the third member is inserted in the fitting through-hole from one of the two end openings thereof that is opposite to the other end opening in which the fitting projecting portion is to be press-fitted, the fitting projecting portion is press-fitted in the fitting through-hole to butt the third member, the press-fit-end position of the fitting projecting portion can be selected at any desired position. Therefore, the press-fit-end position of the two members can be selected at any desired position by selecting a depth to which the third member is inserted in the fitting through-hole.

(29) An inertia-press-fit method according to the feature (28), wherein a butting projection which is harder than an end surface of the fitting projecting portion is formed on an end surface of a portion of the third member that is inserted in the fitting through-hole, and wherein the butting projection is caused to bite into the end surface of the fitting projecting portion.

Since the butting projection formed on the third member bites into the end surface of the fitting projecting portion, at least a portion of the kinetic energy remaining on at least one of the two members is absorbed by the plastic deformation of the end portion of the fitting projecting portion. Thus, the rebounding of the fitting projecting portion and the third member is prevented or reduced, and an actual press-fit-end position is not largely deviated from a prescribed position.

(30) An inertia-press-fit method according to the feature (29), wherein the fitting recessed portion has an annular groove which is formed in a portion of an inner circumferential surface of the fitting through-hole that is adjacent to the end surface of the third member, and wherein a portion of the fitting projecting portion that is forced, by the biting of the butting projection, to expand outward engages the annular groove.

According to the present feature, the end portion of the fitting projecting portion is likely to plastically deform, and the portion of the fitting projecting portion that is forced to expand outward is caused to engage the annular groove. Therefore, the strength with which the two members are bonded with each other is increased.

BRIEF DESCRIPTION OF DRAWINGS

FIG. 13 is cross-sectioned, side elevation views for explaining steps of press-fitting of two members in an inertia-press-fit method as a seventh embodiment of the present invention.

FIG. 14 is cross-sectioned, side elevation views for explaining steps of press-fitting of two members in an inertia-press-fit method as an eighth embodiment of the present invention.

EMBODIMENTS OF INVENTION

Hereinafter, some preferred embodiments of the present invention will be described in detail by reference to the drawings.

Figure 1:
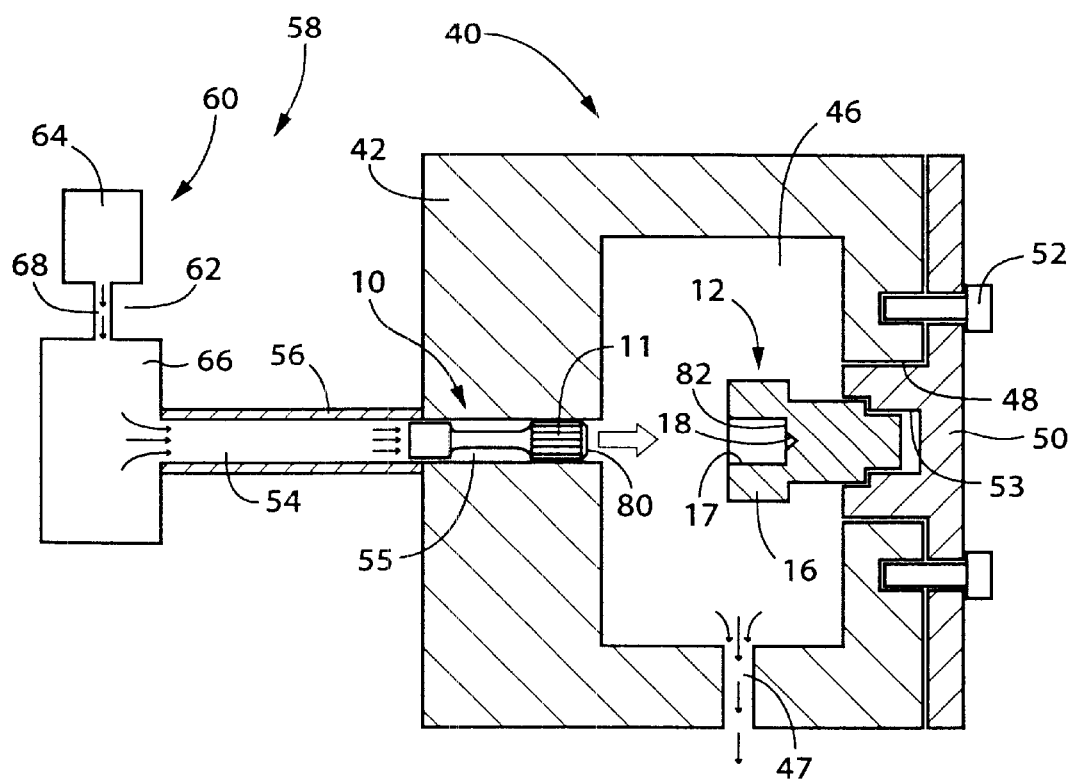
FIG. 1 is a cross-sectioned, side elevation view of an inertia-press-fit device which is suitable for performing an inertia-press-fit method as a first embodiment of the present invention.

The first embodiment of the present invention is a method of press-fitting a moving member as a first member in a still member as a second member. More specifically described, as shown in FIG. 1, the first embodiment is a method of accelerating a first member 10 and press-fitting a fitting projecting portion 11 of the first member 10 in a fitting recessed portion 16 of a second member 12. The first member 10 is a torsion bar which is used in a power steering device of an automotive vehicle, and the second member 12 is a shaft which is also used in the power steering device and in which the torsion bar 10 is press-fitted such that the bar 10 cannot be separated from, or rotated relative to, the shaft. The two members 10, 12 are formed of heat treated steel.

The first member 10 has a circular cross section and is elongate along an axis line thereof. The fitting projecting portion 11 is formed at one end portion of the first member 10. The second member 12 has a generally cylindrical, stepped shape, and a fitting hole 17 with a bottom surface is formed in a central portion of an end surface of the second member 12. The fitting recessed portion 16 is provided by a portion of the second member 12 that has the fitting hole 17. A recess 18 is formed in a central portion of the bottom surface of the fitting hole 17. The recess 18 is formed by a tip of a drill which is used to prepare, in the second member 12, a hole prior to reaming.

Since the fitting projecting portion 11 is interference-fitted in the fitting recessed portion 16, a pre-fit dimension of an outer diameter of the projecting portion 11 is greater than that of an inner diameter of the recessed portion 16. An outer circumferential surface of the projecting portion 11 is formed with a serration consisting of lands and grooves which extend in an axial direction of the projecting portion 11 such that the lands and the grooves are alternate with each other in a circumferential direction of the projecting portion 11.

The present inertia-press-fit method is performed by an inertia-press-fit device shown in FIG. 1.

This inertia-press-fit device includes a holding device 40 which holds the second member 12 in a horizontal posture thereof. The holding device 40 includes a housing 42, and an air chamber 46 which is formed in the housing 42. The second member 12 is held in the air chamber 46. The air chamber 46 is always communicated with the atmosphere via a through-hole 47. The housing 42 has a through-hole 48 which is communicated, at one end thereof, with the air chamber 16 and is communicated, at the other end thereof, with the atmosphere. The through-hole 48 is closed by a cap 50 which is detachably attached to the housing 42 with bolts 52. The cap 50 has, on the side of the air chamber 46, a fitting hole 53 in which one (rear) of opposite end portions of the second member 12 that is opposite to the other end portion in which the first member 10 is to interference-fit, fits.

The inertia-press-fit device additionally includes a guide passage 54 which guides the first member 10 such that the first member 10 is substantially airtightly slideable in the guide passage 54. The guide passage 54 is provided by an inner passage 55 of the housing 42 and an inner passage of a pipe 56 as a passage-forming member, such that the guide passage 54 is coaxial with the second member 12 held by the holding device 40. The guide passage 54 is connected, at one end thereof, to the air chamber 46. The first member 10 is fitted in the guide passage 54 such that the fitting projecting portion 11 of the first member 10 is substantially airtightly slideable in the guide passage 54.

The inertia-press-fit device further includes an accelerating device 58 which accelerates the first member 10. The accelerating device 58 includes a high-pressure device 60 which creates, in rear of the first member 10, an air pressure higher than the atmospheric pressure. The high-pressure device 60 includes (a) a housing 62, (b) a high-pressure source 64 which stores a high-pressure air and supplies the same, as needed, and (c) an air chamber 66 which is formed in the housing 62. The high-pressure source 64 has a structure which includes, e.g., a compressor and a control valve. The air chamber 66 is connected to the high-pressure source 64 via an air passage 68, and is also connected to the other end portion of the guide passage 54.

Next, respective steps of the present inertia-press-fit method will be described in the order of time.

Before the two members 10, 12 are press-fitted with each other, each of the two members 10, 12 is set at a corresponding prescribed position in the inertia-press-fit device.

In this state, if the high-pressure air is supplied from the high-pressure source 64 to the air chamber 66 via the air passage 68, the high-pressure air is supplied to a space in the guide passage 54. If the high-pressure air is supplied to the inner space of the guide passage 54, the air pressure in rear of the first member 10 becomes higher than the atmospheric pressure.

Thus, the first member 10 is accelerated in a direction parallel to the axis line thereof, so that kinetic energy is applied to the first member 10. As a result, the first member 10 approaches the second member 12 in the state in which the first and second members 10, 12 remain coaxial with each other. Eventually, the first member 10 contacts the second member 12, and the press-fitting of the two members 10, 12 commences. During the press-fitting, the lands of the serration of the first member 10 bite into an inner circumferential surface of the fitting recessed portion 16 of the second member 12, while the two members 10, 12 are welded to each other because of the heat produced by the friction of the two members 10, 12. Thus, the two members 10, 12 are strongly bonded with each other.

After the press-fitting, the cap 50 is removed from the housing 42, and a press-fit assembly of the two members 10, 12 is taken out of the holding device 40.

The accelerating device 58 is so designed as to apply, to the first member 10, a kinetic energy greater than a standard kinetic energy. The standard kinetic energy is defined as a kinetic energy which assures that, under the condition that respective pre-fit dimensions of the first and second members 10, 12 are normal, a press-fit dimension of the two members 10, 12 (i.e., a difference between the outer diameter of the serration of the first member 10 and the inner diameter of the press-fitting hole of the second member 12) are normal, and respective hardness values of respective materials of the two members 10, 12 are normal, the kinetic energy applied to the first member 10 becomes zero when an end surface 80 (i.e., first stopper surface) of the first member 10 is brought into close contact with a bottom surface (i.e., second stopper surface) 82 of the second member 12. Since, in the present embodiment, the kinetic energy applied to the first member 10 is greater than the standard kinetic energy, the end surface 80 of the first member 10 is prevented from stopping before reaching the bottom surface 82 of the second member 12 because the kinetic energy, the press-fit dimension, or the hardness values of the materials are not normal. Even if the kinetic energy, the press-fit dimension, or the hardness values of the materials may not be normal, it is assured that the end surface 80 of the first member 10 butts the bottom surface 82 of the second member 12.

In the present embodiment, the whole surface of the fitting projecting portion 11 of the first member 10 has a Vickers hardness Hv falling in a range of 290 to 430, and the whole surface of the fitting recessed portion 16 of the second member 12 has a Vickers hardness Hv equal to 280.

The present inventors had conducted an experiment in which a plurality of sample pairs are arbitrarily extracted from a plurality of first members 10 and a plurality of second members 12, respective surfaces of the extracted first members 10 are treated by heat under different conditions, so that the first members 10 have 640, 470, 430, 400, 360, and 290 Vickers hardness values Hv, respectively, and each of the thus obtained first members 10 is press-fitted in a corresponding one of the extracted second members 12. In this experiment, 0.2 mm was used as a normal press-fit dimension of the first and second members 10, 12, and 210 km/h was used as a normal speed of each first member 10 immediate before the each first member 10 starts entering the corresponding second member 12.

Figure 2:
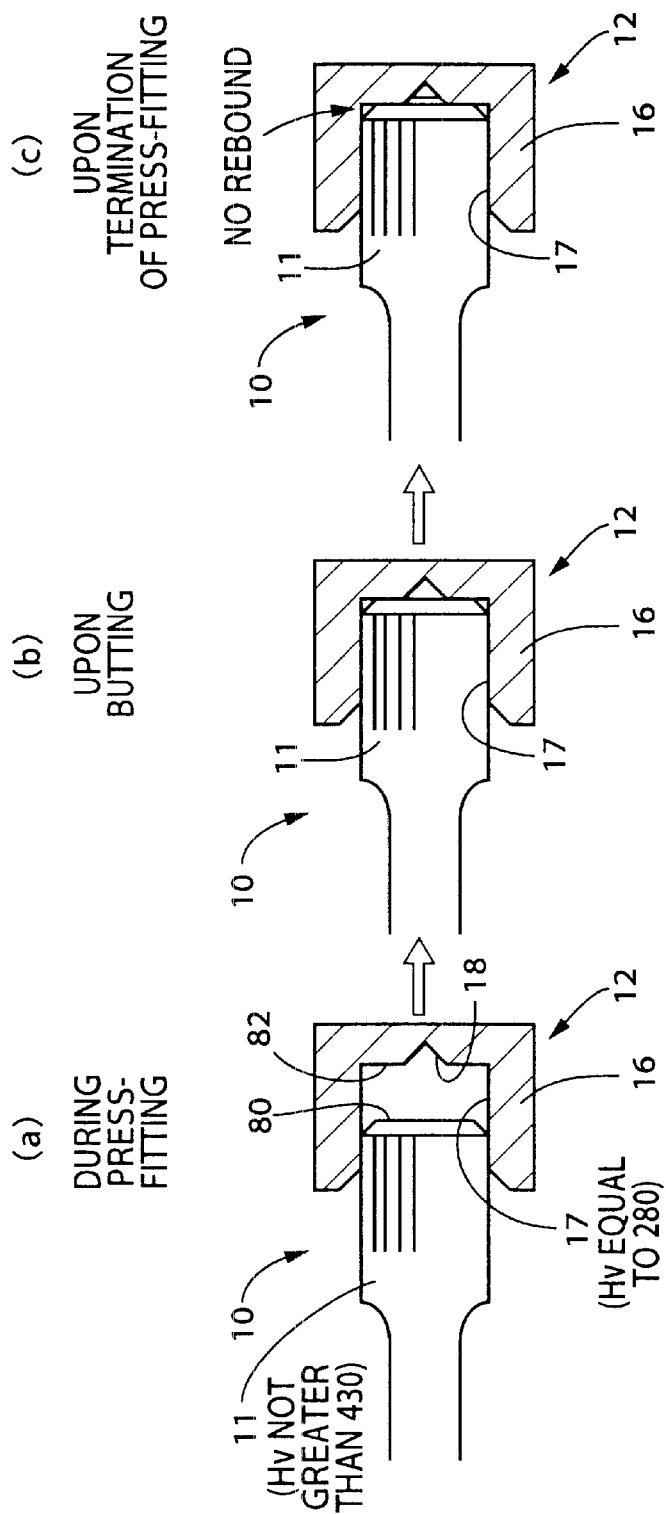
FIG. 2 is cross-sectioned, side elevation views for explaining steps of press-fitting of two members in the first embodiment.

The results of the above experiment are shown in FIG. 2 with respect to the case where the first member 10 has a Vickers hardness Hv not greater than 430 and the second member 12 has a Vickers hardness Hv equal to 280. FIG. 2 shows, in the order of time, respective steps of press-fitting of the two members 10, 12, more specifically described, the step in which the press-fitting progresses, the step in which the end surface 80 is in close contact with the bottom surface 82, and the step in which the press-fitting ends. FIG. 2 shows that the first member 10 is not rebounded from the second member 12 after the end surface 80 butts the bottom surface 82. That is, the press-fitting of the two members 10, 12 ends at a substantially normal position, and a fit length of the two members 10, 12 is accurately equal to a normal value. It is speculated that those results are obtained because, even if the first member 10 may have a remaining kinetic energy when the first member 10 butts the second member 12, the kinetic energy causes the first and second members 10, 12 to plastically deform and accordingly is absorbed by the two members 10, 12. However, since the first member 10 is more likely to plastically deform owing to its shape factor, the first member 10 mainly deforms to absorb the kinetic energy.

The plastic deformation of the first member 10 is observed as, e.g., a phenomenon that an outer peripheral portion of the end surface 80 of the first member 10 becomes depressed. The above-indicated recess 18 allows the material of the end surface 80 of the first member 10 to flow from the outer peripheral portion of the surface 80 toward a central portion thereof and, under this condition, the end surface 80 is caused to butt the bottom surface 82. Since the end surface 80 of the first member 10 is thus depressed, the first member 10 is excessively press-fitted in the second member 12 (i.e., the first member 10 is further press-fitted in the second member 12, from a normal press-fit state in which the two members 10, 12 are in close contact with each other). However, the present inventors had recognized that the excessive press-fit amount is only an amount not greater than 0.2 mm.

Figure 3:
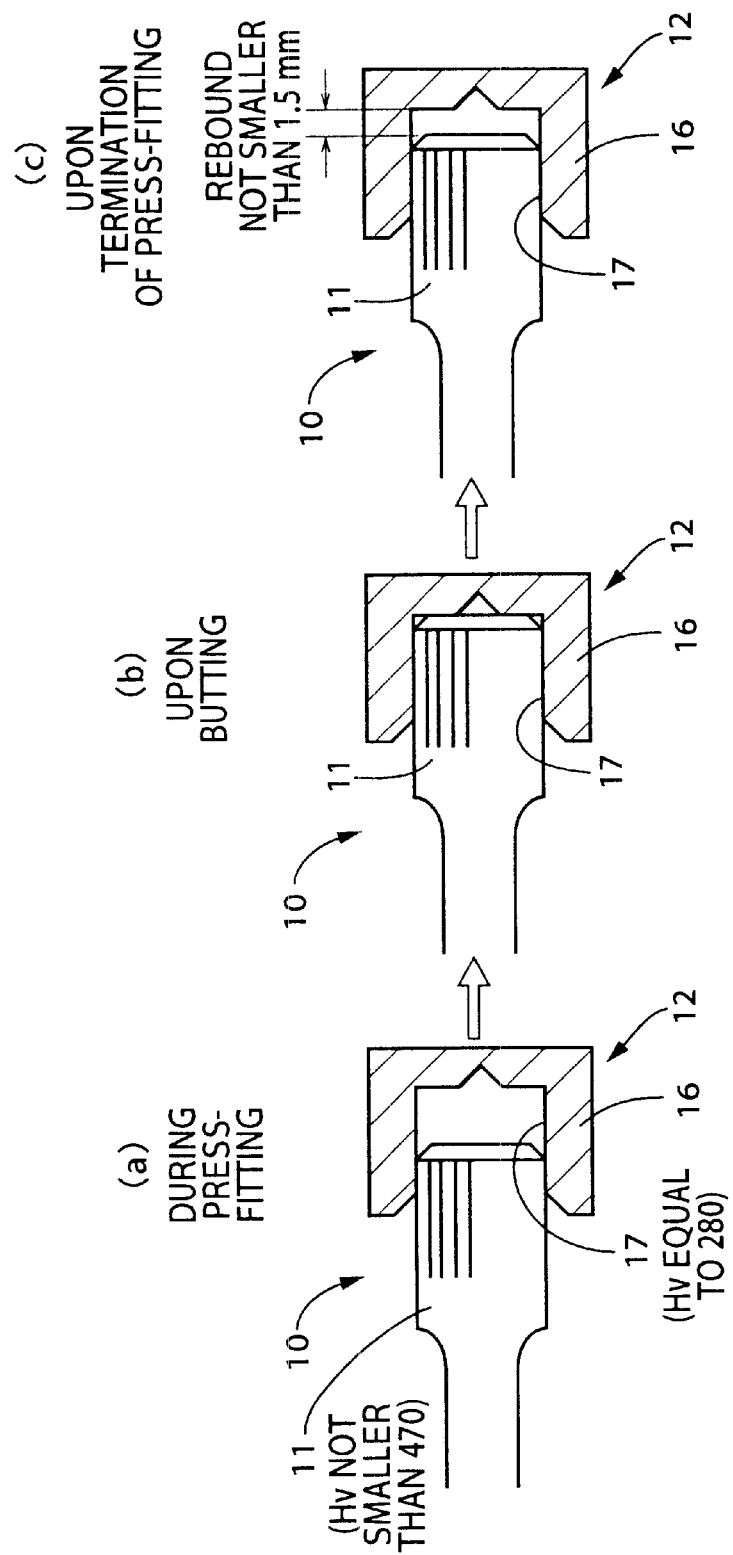
FIG. 3 is cross-sectioned, side elevation views for explaining steps of press-fitting of two members in a comparative example corresponding to the first embodiment.

In contrast, like FIG. 2, FIG. 3 shows respective steps of press-fitting of the two members 10, 12 in the case where the first member 10 has a Vickers hardness Hv not smaller than 470 and the second member 12 has a Vickers hardness Hv equal to 280. FIG. 2 shows that the first member 10 is rebounded by a distance equal to, or greater than, 1.5 mm from the second member 12 immediately after the end surface 80 butts the bottom surface 82. That is, the press-fitting of the two members 10, 12 ends at a position deviated from a normal relative position, and a fit length of the two members 10, 12 is shorter than a normal value. It is speculated that those results are obtained because the first member 10 hardly plastically deforms and accordingly the kinetic energy which remains when the first member 10 butts the second member 12 is not absorbed by the plastic deformation of the first member 10.

Based on the above experimental results, the first member 10 which has a Vickers hardness Hv in the range of 290 to 430 and the second member 12 which has a Vickers hardness Hv equal to 280 are used in the present embodiment.

The present inventors had conducted, for the purpose of preventing a press-fit assembly whose fit length is made short because respective pre-fit dimensions of the first and second members 10, 12 are not normal, another experiment in which respective pre-fit dimensions of a plurality of first members 10 and a plurality of second members 12 are measured, prior to press-fitting, with a high degree of accuracy; based on the measurement results, a plurality of pairs of first and second members 10, 12 are selected such that the press-fit dimension of each selected pair of first and second members 10, 12 falls in an appropriate range; and the each selected pair of first and second members 10, 12 are press-fitted with each other. In this way, inappropriate press-fit assemblies are prevented. However, the step of accurately measuring the respective dimensions of the first and second members 10, 12 and the step of pairing the first and second members 10, 12 are additionally needed, and accordingly the efficiency of the press-fitting operation cannot be sufficiently increased. In contrast, in the present embodiment, those additional steps are not needed and accordingly the efficiency of the press-fitting operation can be sufficiently increased.

Next, a second embodiment of the present invention will be described. However, the present embodiment is different from the first embodiment only with respect to the shape of an end portion of a first member, and all the other elements of the present embodiment are the same as those of the first embodiment. Therefore, only that shape will be described in detail below, while the same reference numerals as used in the first embodiment are used to designate the corresponding elements of the present embodiment, without providing detailed description of those elements.

Figure 4:
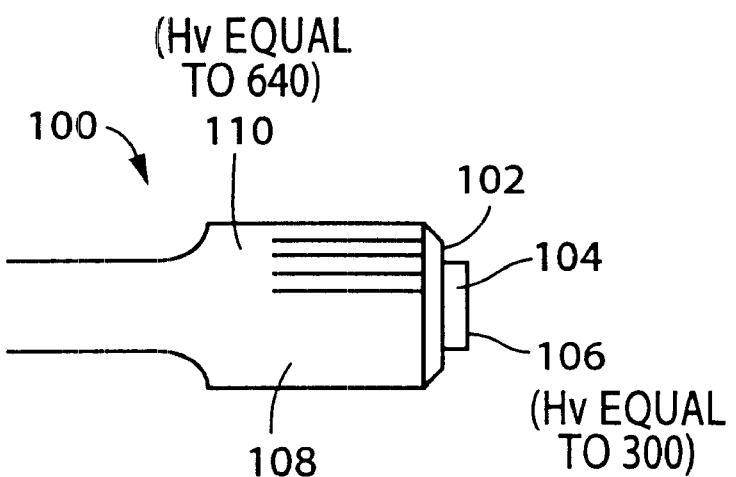
FIG. 4 is a side elevation view of one of two members used in an inertia-press-fit method as a second embodiment of the present invention.
Figure 5:
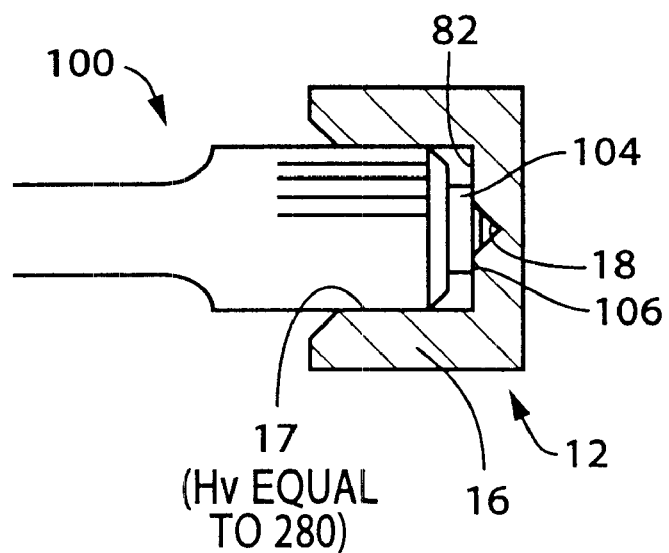
FIG. 5 is a cross-sectioned, side elevation view for explaining a state in which the press-fitting of the two members used in the second embodiment has ended.

As shown in FIG. 4, in the present embodiment, a projection 104 integrally projects from a central portion of an end surface 102 of a first member 100, such that the projection 104 has a circular cross section and is coaxial with the first member 100. An end surface 106 of the projection 104 has a Vickers hardness Hv equal to 300. A press-fit surface of a fitting recessed portion 16 of a second member 12 has a Vickers hardness Hv equal to 280. Therefore, at the time of press-fitting, the end surface 106 of the projection 104 of the first member 100 butts a bottom surface 82 of the second member 12, as shown in FIG. 5, and, if the first member 100 has a remaining kinetic energy immediately after the butting, the projection 104 plastically deforms to absorb the remaining kinetic energy, so that the rebound of the first member 100 is lowered. That is, the projection 104 as a portion of the first member 100 functions as a buffer (butting) portion which plastically deforms to absorb an excessive kinetic energy of the first member 100.

An outer circumferential surface of a fitting projecting portion 108 of the first member 100, that is, a press-fit surface 110 to be press-fitted in the fitting recessed portion 16 of the second member 12 has a Vickers hardness Hv equal to 640. Thus, the first member 100 is soft in the projection 104 (the butting portion) and is hard in the press-fit portion (interference-fit portion) to be press-fitted in the second member 12. With this structure, a fit length of the two members 100, 12 can be accurately controlled, and the two members 100, 12 can be strongly bonded with each other owing to an anchoring effect that lands (projecting portions) of a hard serration of the first member 100 mechanically engage a soft inner circumferential surface of the second member 12.

Next, a third embodiment of the present invention will be described. However, the present embodiment is different from the second embodiment only with respect to the shape of an end portion of a first member, and all the other elements of the present embodiment are the same as those of the second embodiment. Therefore, only that shape will be described in detail below, while the same reference numerals as used in the second embodiment are used to designate the corresponding elements of the present embodiment, without providing detailed description of those elements.

Figure 6:
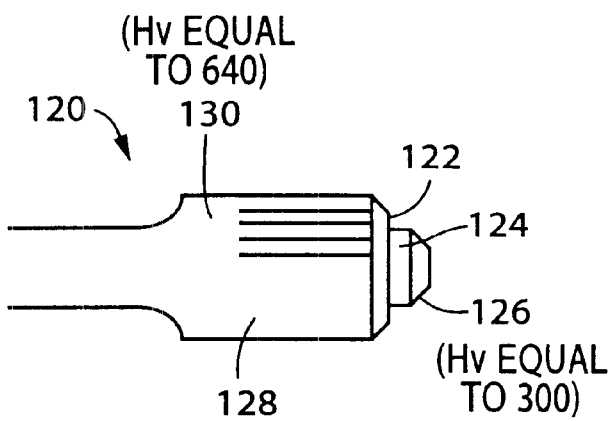
FIG. 6 is a side elevation view of one of two members used in an inertia-press-fit method as a third embodiment of the present invention.

As shown in FIG. 6, in the present embodiment, the diameter of an end portion of a first member gradually decreases, though in the second embodiment the projection 104 having a constant diameter over its entire length projects from the central portion of the end surface 102 of the first member 100. More specifically described, like in the second embodiment, a projection 124 integrally projects from a central portion of an end surface 122 of a first member 120, such that the projection 124 has a circular cross section and is coaxial with the first member 120. Unlike the second embodiment, an outer peripheral portion of an end portion of the projection 124 is chamfered, so that the end portion of the projection 124 has a stopper surface 126 which is inclined relative to a plane perpendicular to a direction in which the two members 120, 12 approach each other.

Figure 7:
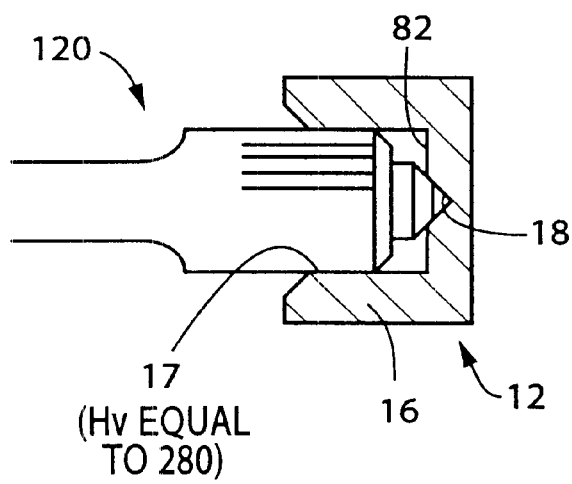
FIG. 7 is a cross-sectioned, side elevation view for explaining a state in which the press-fitting of the two members used in the third embodiment has ended.

In the present embodiment, at the time of press-fitting, the stopper surface 126 of the projection 124 of the first member 120 butts a bottom surface 82 of the second member 12, as shown in FIG. 7, and, if the first member 120 has a remaining kinetic energy at the time of butting, the projection 124 plastically deforms to absorb the remaining kinetic energy, so that a fit length of the two members 120, 12 can be accurately controlled. In addition, in the present embodiment, the first member 120 butts the bottom surface 82 of the second member 12 at the end surface 106 of the projection 104, i.e., the non-perpendicular stopper surface 126 that is not perpendicular to the direction in which the two members 120, 12 approach each other, in contrast to the second embodiment in which the first member 100 butts at the perpendicular stopper surface. Therefore, at the time of butting, the first member 120 receives, from the second member 12, only a rebounding force which is smaller than an excessive force acting from the first member 120 to the second member 12 based on the kinetic energy remaining on the first member 120 upon butting. For this reason, too, the rebound of the first member 120 is lowered.

In the present embodiment, like in the second embodiment, the stopper surface 126 of the projection 124 has a Vickers hardness Hv equal to 300, and an outer circumferential surface of a fitting projecting portion 128 of the first member 120, that is, a press-fit surface 130 to be press-fitted in the fitting recessed portion 16 of the second member 12 has a Vickers hardness Hv equal to 640. Thus, the first member 120 is soft in the projection 124 and is hard in the press-fit portion (interference-fit portion) to be press-fitted in the second member 12. With this structure, the two members 120, 12 can be strongly bonded with each other owing to an anchoring effect, like in the second embodiment.

Next, a fourth embodiment of the present invention will be described. However, the present embodiment includes many elements common to the first embodiment. Therefore, only different elements of the present embodiment will be described in detail below, while the same reference numerals as used in the first embodiment are used to designate the corresponding elements of the present embodiment, without providing detailed description of those elements.

Although in the first embodiment the first member 10 includes an integral portion which absorbs the kinetic energy of the first member 10 that remains at the time of butting of the first and second members 10, 12, a press-fit-end position of two members 10, 12 is defined, in the present embodiment, by butting of the two members 10, 12 via a buffer member, which plastically deforms to absorb the kinetic energy of the first member 10 that remains immediately after the butting of the two members 10, 12.

Figure 8:
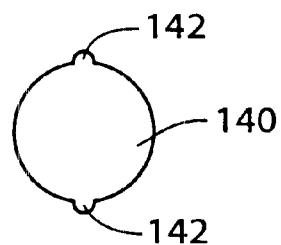
FIG. 8 is a front elevation view of a buffer member used in an inertia-press-fit method as a fourth embodiment of the present invention.

FIG. 8 is a front elevation view of a buffer member 140. The buffer member 140 has a thin-disc-like shape whose diameter is somewhat smaller than an inner diameter of a fitting recessed portion 16 of a second member 12, and the buffer member 140 can fit in the recessed portion 16. The buffer member 140 has a plurality of projections 142 formed on an outer circumferential surface thereof. In the state in which the buffer member 140 fits in the recessed portion 16, the projections 142 partly engage an inner circumferential surface of the recessed portion 16, so that the position of the buffer member 140 is prevented from being easily changed. The buffer member 140 is formed of copper or soft steel that is softer, i.e., more plastically deformable, than the heat treated steel used to form the two members 10, 12. The first member 10 has a Vickers hardness Hv not smaller than 470, and the second member 12 has a Vickers hardness Hv not smaller than 280.

Figure 9:
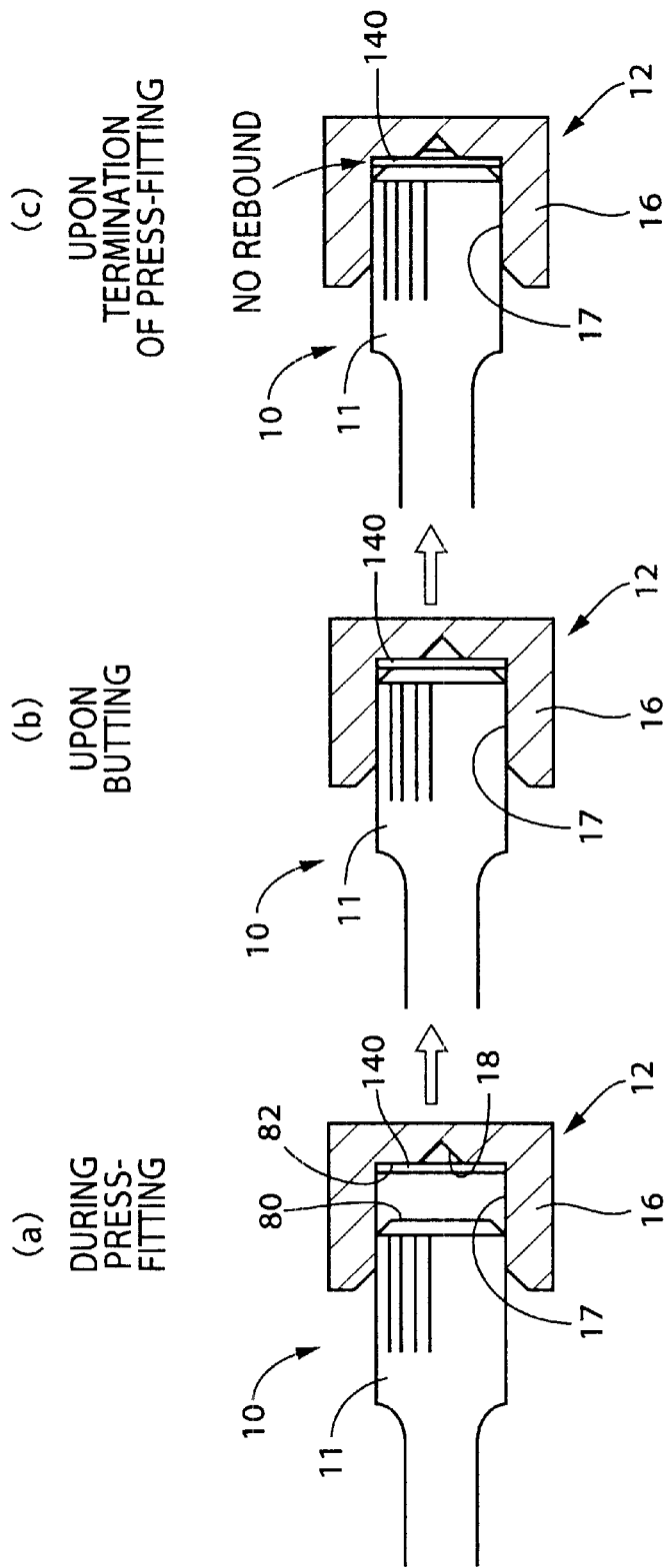
FIG. 9 is cross-sectioned, side elevation views for explaining a state in which the press-fitting of the two members used in the fourth embodiment has ended.

FIG. 9 shows respective steps of press-fitting of the two members 10, 12 via the buffer member 140, in the order of time. Prior to the press-fitting, the buffer member 140 is fitted in the fitting recessed portion 16 of the second member 12, so that the buffer member 140 closely contacts a bottom surface of the recessed portion 16 and does not come off the same 16. Subsequently the acceleration of the first member 10 is started and then the press-fitting of the first member 10 in the second member 12 is started. Subsequently an end surface 80 of the first member 10 butts a bottom surface 82 of the second member 12 via the buffer member 140. If the first member has a remaining kinetic energy at the time of butting, the buffer member 140 plastically deforms because of the remaining kinetic energy, thereby absorbing the kinetic energy. Consequently substantially no rebound of the first member 10 from the second member 12 occurs though the first member 10 has the excessive kinetic energy at the time of butting.

Since in the present embodiment the buffer member 140 that is separate from the two members 10, 12 absorbs the excessive kinetic energy, it is not needed to perform a special treatment on the two members 10, 12, and accordingly respective natures of the respective materials of the two members 10, 12 are not limited by the need to absorb the kinetic energy.

Figure 10:
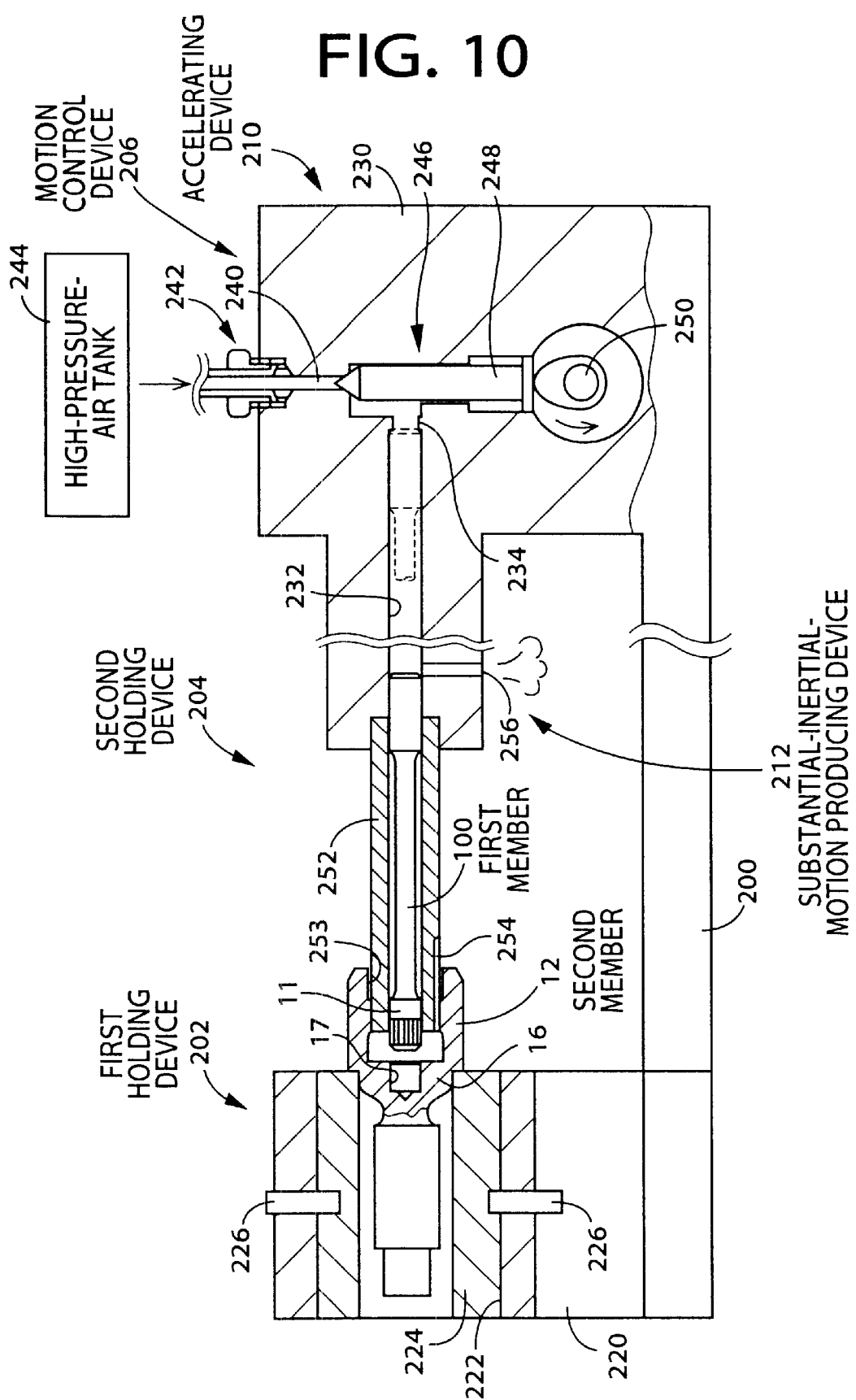
FIG. 10 is a cross-sectioned, side elevation view of an inertia-press-fit device which is suitable for performing an inertia-press-fit method as a fifth embodiment of the present invention and an inertia-press-fit method as a sixth embodiment of the present invention.

The present inventors had examined, on the first member 100 and the second member 12 shown in FIGS. 4 and 5, a relationship between kinetic energy and press-fit-end position, using an inertia-press-fit device shown in FIG. 10. The present press-fit device includes a base 200; a first holding device 202 which holds the second member 12 as a member in which the first member 100 is to be press-fitted, such that the second member 12 is fixedly held in a horizontal posture thereof; a second holding device 204 which holds the first member 100 as a member to be press-fitted in the second member 12, such that the first member 100 in a horizontal posture thereof is movable toward the second member 12 held by the first holding device 202; and a motion control device 206 which controls motion of the first member 100 held by the second holding device 204. The first and second holding devices 202, 204 and the motion control device 206 are all provided on the base 200. The motion control device 206 includes an accelerating device 210 and a substantial-inertial-motion producing mechanism 212.

The first holding device 202 includes a frame 220. The frame 220 is fixed to the base 200. The frame 220 has a hole 222 which extends horizontally. A cylindrical member 224 as a holding member is detachably attached to the hole 222. A pair of pins 226 are detachably attached to the cylindrical member 224 and the frame 220, in respective radial directions of the member 224. The two pins 226 are simultaneously radially fitted in the cylindrical member 224 and the frame 220, so that the cylindrical member 64 is prevented from coming off the frame 220. The second member 12 is held by the first holding device 202, as follows: First, the two pins 226 are removed from the first holding device 202, and the cylindrical member 224 is removed from the frame 220. Next, the second member 12 is fixed to the cylindrical member 224, so that the two members 12, 224 are attached to the frame 220.

The second holding device 204 includes a frame 230. The frame 230 is fixed to the base 200. The frame 230 has a holding hole 232 which has a bottom, which extends coaxially with the second member 12 held by the first holding device 202, and which opens on the side of the first holding device 202. The first member 100 fits in the holding hole 232 in a substantially airtight manner and such that the first member 100 is slideable in the hole 232, so that the first member 100 is movable toward the second member 12 held by the first holding device 202. A stopper portion 234 is provided by the bottom of the holding hole 232. The stopper portion 234 positions, in the holding hole 232, the first member 100 at a normal position indicated at broken line in FIG. 10.

The frame 230 has an air passage 240. The air passage 240 is connected, at a port 242, to an air tank 244 which always stores air under pressure. A needle valve 246 as a control valve is provided at an intermediate position on the air passage 240. The needle valve 246 includes a valve member 248 which is slideably fitted in the frame 230, and is switchable to a shut-down state in which the valve 246 shuts down the air passage 240 and inhibits the air (pressurized air) from the air tank 244 from flowing into the holding hole 232 and to an open state in which the valve 246 opens the air passage 240 and allows the air from the air tank 244 to flow into the holding hole 232. This switching is performed by a cam 250 which is driven by a drive device (not shown).

The second holding device 204 includes a guide tube 252 as a guide member. The guide tube 252 is fixed, at one end thereof, to the frame 230, and the other end of the guide tube 252 reaches a large-diameter hole 253 of the second member 12 held by the first holding device 202. The first member 100 is fitted in the guide tube 252 in a substantially airtight manner and such that the first member 100 is slideable in the tube 252. Thus, the guide tube 252 defines a path along which the first member 100 is moved. In the present embodiment, the holding hole 232 and the guide tube 252 cooperate with each other to form a guide passage which guides the first member 100. A groove 254 is formed in an outer circumferential surface of a portion of the guide tube 252 that is fitted in the second member 12, such that the groove 254 extends in an axial direction of the tube 252. The groove 254 provides an air-discharge passage. The frame 230 additionally has a communication hole 256 which communicates, immediately before the first member 100 butts the second member 12, the air chamber created in rear of the first member 100 in the holding hole 232, with the atmosphere. Therefore, immediately before the first member 100 butts the second member 12, the pressure in the air chamber in rear of the first member 100 becomes substantially equal to the atmospheric pressure, so that the first member 100 does a substantially inertial motion. Thus, the air passage 240, the air tank 244, the needle valve 246, the cam 250, etc. cooperate with one another to provide the accelerating device 210; a portion of the frame 230 that defines the communication hole 256 provides the substantial-inertial-motion producing device 212; and the accelerating device 210 and the substantial-inertial-motion producing device 212 cooperate with each other to provide the motion control device 206.

Figure 11:
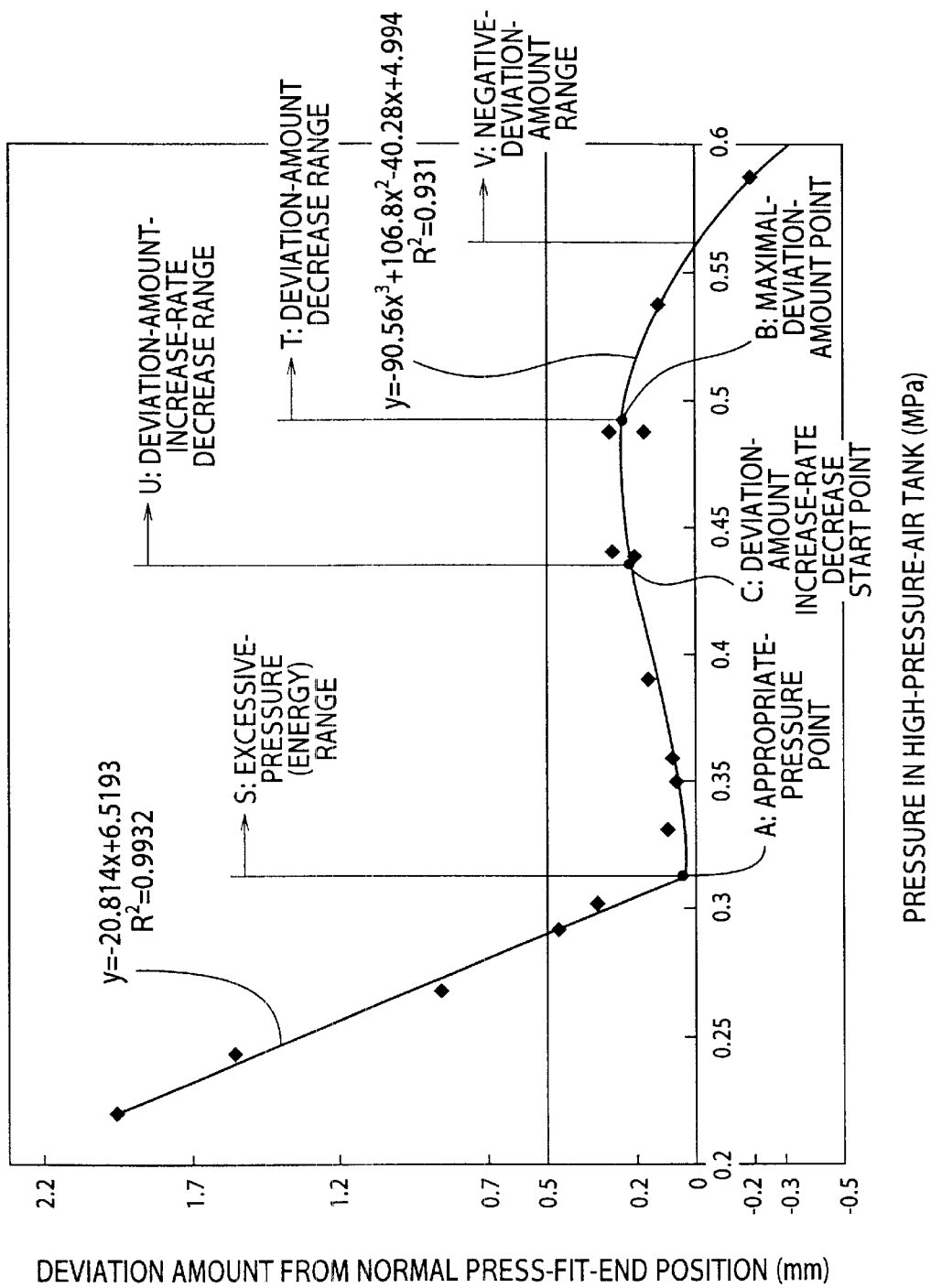
FIG. 11 is a graph for explaining the inertia-press-fit method as the fifth embodiment of the present invention and the inertia-press-fit method as the sixth embodiment of the present invention.

In the inertia-press-fit device constructed as described above, the pressure of the air tank 244 is changed to various values to change the kinetic energy applied to the first member 100, and thereby examine a relationship between pressure (that can be thought as an index of kinetic energy) with which the first member 100 is pressed-fitted in the second member 12, and amount of deviation of actual press-fit-end position from normal press-fit-end position. FIG. 11 shows the thus obtained relationship. This amount of deviation means an amount of deviation of an actual length of each press-fit assembly from a normal length thereof in which the first member 100 is press-fitted in the second member 12 in the state in which the end surface 106 of the projection 104 is in close contact with the bottom surface 82 of the fitting recessed portion 16. When the actual length is greater than the normal length, the deviation amount is positive. As is apparent from FIG. 11, as the pressure increases, the deviation amount decreases. Once the deviation amount reaches zero, it increases up to a maximal value and then decreases again down to negative values. A point, A, where the deviation amount is equal to zero will be referred to as the "appropriate-pressure point" (that can be said as the "appropriate-energy point"); a range, S, in which the pressure is greater than that of the point A will be referred to as the "excessive-pressure range" (that can be said as the "excessive-energy range"); a point, B, where the deviation amount takes the maximal value will be referred to as the "maximal-deviation-amount point"; a range, T, in which the kinetic energy is greater than that of the point B will be referred to as the "deviation-amount decrease range"; and a range, V, in which the deviation amount is negative will be referred to as the "negative-deviation-amount range".

Assuming that the pressure in the air tank 244 that is an amount corresponding to the above-indicated kinetic energy is expressed as x and the deviation amount of an actual press-fit-end position from the normal press-fit-end position is expressed as y, the relationship between the pressure and the deviation amount can be approximated by a straight line in an insufficient-pressure range in which the pressure is smaller than that of the appropriate-pressure point A, and can be approximated by a curved line in the excessive-pressure range. Assuming that this curved line is defined by a cubic curved line, the cubic curved line is expressed by the following expression:

$$y = -90.56x^3 + 106.8x^2 - 40.28x + 4.994$$

This expression can be used to determine a division point, C, which divides the cubic curved line representing the relationship between pressure x and deviation amount y in the excessive-pressure range, into a downwards-convex portion and an upwards-convex portion. Since the division point C is the point where the rate of increase of the kinetic energy x with respect to the deviation amount y stops increasing and starts decreasing, it will be referred to as the "deviation-amount-increase-rate decrease start point", and a range, U, in which the kinetic energy is greater than that of the deviation-amount-increase-rate decrease start point will be referred to as the deviation-amount-increase-rate decrease range.

In the case shown in FIG. 11, the deviation amount falls in the range of ±0.3 mm, in a wide pressure range between 0.3 MPa and 0.6 MPa. In the case where a permissible range of the deviation amount is, e.g., the range of ±0.4 mm, the pressure is allowed to vary largely between 0.3 MPa and 0.6 MPa. In the case where the permissible range of the deviation amount is narrow, the deviation amount can be controlled to fall within the narrow permissible range even though the pressure may largely vary, if the projection 104 is made easily plastically deformable and accordingly the maximal value of the deviation amount is decreased. Generally, if the sum of respective plastic-deformation capabilities of respective butting portions of two members which are press-fitted with each other is greater than a prescribed plastic-deformation capability, the maximal value of the deviation amount can be controlled to fall within the permissible range thereof. In this manner, the required accuracy of control of the kinetic energy to be applied can be largely lowered. This manner corresponds to one embodiment (the fifth embodiment) of the present invention that is recited in claim 5. The inertia-press-fit device shown in FIG. 10 corresponds to an inertia-press-fit device which can be used to perform the fifth embodiment of the present invention.

The reason why the point A shown in FIG. 11 is referred as to the appropriate-pressure point (or the appropriate-energy point) is that it is appropriate for the first and second members 100, 12 to be press-fitted with each other till the end surface 106 of the projection 104 is brought into close contact with the bottom surface 82 of the fitting recessed portion 16. If the pressure of the air acting on the first member 100 is controlled to a value near this appropriate-pressure point, the accuracy of dimensions of the press-fit assembly of the first and second members 100, 12 can be increased. In view of this, it is very natural that the point A be said as the appropriate-pressure point. Even in the case where the pressure is controlled to a value near the appropriate-pressure point, to increase the accuracy of the dimensions, it is effective to make the respective butting portions of the first and second members 100, 12 easily plastically deformable and thereby decrease the maximal value of the deviation amount. Since the rate of increase of the deviation amount in the pressure range in which the pressure is greater than that of the point A, is decreased by decreasing the maximal value, the accuracy of the dimensions can be easily maintained.

Figure 12:
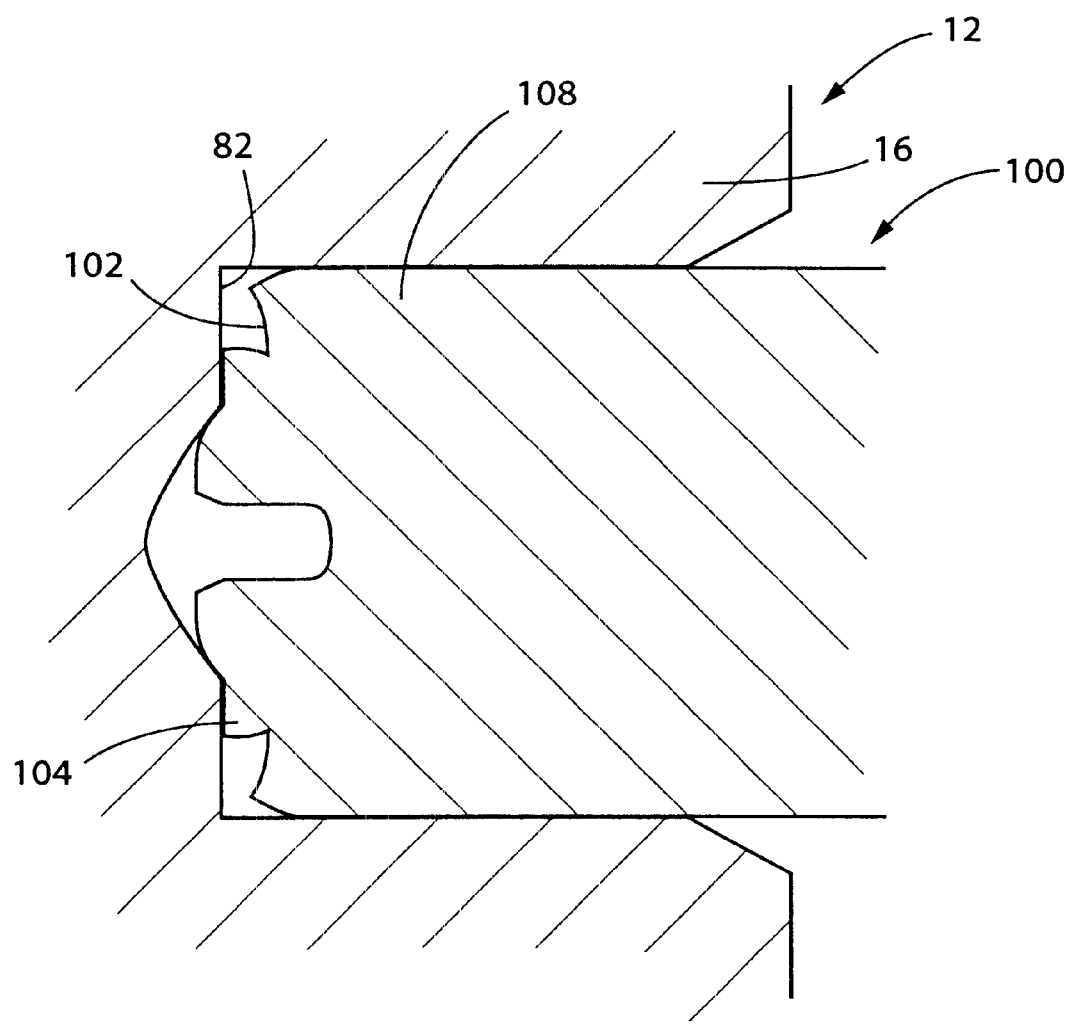
FIG. 12 is an enlarged view of a press-fit assembly, cross-sectioned along an axis line thereof, which is obtained in the inertia-press-fit method as the sixth embodiment of the present invention.

However, there are some cases where it is desirable that the air pressure acting on the first member 100 be controlled to a value falling within the excessive-pressure range. One (the sixth embodiment) of those cases is that the pressure is so controlled as to increase bonding strength. FIG. 12 shows a press-fit assembly, taken along an axis line thereof, which is obtained by performing press-fitting under the condition that the pressure of the air tank 244 is equal to 0.6 MPa in a range which falls within the deviation-amount decrease range T and in which the deviation amount is negative. As is apparent from FIG. 12, the projection 104 is plastically deformed, the end surface 102 of the fitting projecting portion 11 is depressed, and the outer circumferential surface of the projecting portion 11 is deformed into a barrel-like shape. More specifically described, the diameter of the projecting portion 11 is increased and the press-fit dimension (interference-fit dimension) of the projecting portion 11 and the recessed portion 16 is substantially increased. Thus, the bonding strength with which the first and second members 100, 12 are bonded with each other is increased. This bonding-strength increasing effect is substantially obtained in a range in which the projecting portion 11 is substantially plastically deformed, that is, in the deviation-amount-increase-rate decrease range U, the deviation-amount decrease range T, or the negative-deviation-amount range V, such that the degree of this effect is increased in the order of description of the three ranges U, T, V.

Other embodiments are shown in FIGS. 13 to 16. In each of those embodiments, a first member is press-fitted in a second member by using the inertia-press-fit device shown in FIG. 1. Accordingly, illustration and description of those elements that are common to the first embodiment shown in FIGS. 1 and 2 are omitted, and only different elements will be illustrated and described. In addition, since the first member employed in each of the following embodiments is the same as that employed in the first embodiment, the shape of the first member is schematically illustrated, the same reference numeral as used in the first embodiment is used to designate the first member employed in each of the following embodiments, and detailed description thereof is omitted. It is noted that in each of the following embodiments the first member may be press-fitted in the second member by using the inertia-press-fit device shown in FIG. 10.

FIG. 13(a) and FIG. 13(b) show a second member 300 which has a generally stepped cylindrical shape like the second member 12 employed in the first embodiment (only an end portion of the second member 300 is shown in FIG. 13). The second member 300 has a fitting hole 302 formed in the center of an end surface thereof. The fitting hole 302 has a bottom. A portion of the second member 300 that defines the fitting hole 302 provides a fitting recessed portion 16 of the second member 300. A butting projection 306 projects from a central portion of a bottom surface 304 of the fitting hole 302. In the present embodiment, the butting projection 304 has a substantially conical shape whose diameter decreases in a direction toward the tip thereof. An end surface 80 of a fitting projecting portion 11 as an end portion of the first member 10 has a hardness lower than that of the butting projection 306. The second member 300 has a large-diameter full-annular groove 308 which is formed, in the vicinity of the bottom surface 304, in an inner circumferential surface of the fitting hole 302. The annular groove 308 has a diameter larger than that of the remaining portion of the fitting hole 302, and extends over the entire inner circumferential surface of the same 302. In the figures, the annular groove 308 is illustrated in an exaggerated manner. An actual annular groove is smaller than the illustrated annular groove 308.

When the fitting projecting portion 11 of the first member 10 is press-fitted in the fitting recessed portion 16 of the second member 300, kinetic energy is applied to the first member 10 in a direction parallel to an axis line of the same 10, as shown in FIG. 13(*a*), so that the first member 10 is coaxially press-fitted in the second member 300, as shown in FIG. 13(*b*). Thus, the end surface 80 of the first member 10 butts the butting projection 306 of the second member 300, and the butting projection 306 bites into the end surface 80. The first member 10 has a remaining kinetic energy when the butting projection 306 and the end surface 80 butt each other, and the end surface 80, and its vicinity, of the first member 10 are plastically deformed because of the remaining kinetic energy. Thus, the excessive kinetic energy is absorbed, and the rebound of the first member 10 is minimized. Since the butting projection 306 has a hardness higher than that of the end surface 80 of the first member 10 and the diameter of the projetion 306 decreases toward the tip thereof, the projection 306 easily bites into the end surface 80. In addition, since the butting projection 306 projects from the bottom surface 304 of the fitting hole 302 and the area of butting of the projection 306 on the first member 10 is small, the first member 10 is more easily elastically deformed as compared with the case where the entire end surface 80 of the first member 10 butts the bottom surface 304 of the fitting hole 302. That is, the end portion of the projecting portion 11 that is forced by the projection 306 to expand outward easily extends into the annular groove 308 of the second member 300, so that the extension of the first member 10 engages the annular groove 308. Thus, the first member 10 is prevented from coming off the second member 300 in the axial direction thereof, and the strength of bonding of the two members 10, 300 is increased. Moreover, in the present embodiment, even if the amount of kinetic energy applied to the first member 10 may vary in a wide range, the press-fit-end position of the two members 10, 300 can be stabilized. Thus, the amount of kinetic energy applied can be easily controlled, and accordingly the production cost can be lowered.

Though a second member may have a projection integrally formed on a bottom surface of a fitting hole thereof, as described above, it is possible, as described below, that a projection be provided by a separate member which is attached to a bottom surface of a fitting hole of a second member. FIG. 14(*a*) shows a second member 400 which has a recess 406 formed in a central portion of a bottom surface 404 of a fitting hole 402 thereof. A steel ball 408 is fixed to the recess 406 with an appropriate means such as adhesive. The steel ball 408 projects from the bottom surface 404 of the fitting hole 402, and functions like the butting projection 306 employed in the embodiment shown in FIG. 13. The second member 400 has an annular groove 410 which is formed, in the vicinity of the bottom surface 404, in an inner circumferential surface of the fitting hole 402. The annular groove 410 is similar to the annular groove 308. The steel ball 408 has a hardness higher than that of the end surface 80 of the first member 10 and that of the bottom surface 404 of the second member 400, and the hardness of the bottom surface 404 of the second member 400 is higher than that of the end surface 80 of the first member 10. Therefore, upon press-fitting, the steel ball 408 bites into the end portion of the fitting projecting portion 11, thereby expanding the end portion in radially outward directions, as shown in FIG. 14(*b*), so that the end portion engages the annular groove 410. The present embodiment is suitable for cases where it is difficult to form a projection on a bottom surface of a fitting hole of a second member or it is difficult to form a projection having a sufficiently high hardness.

Figure 15:
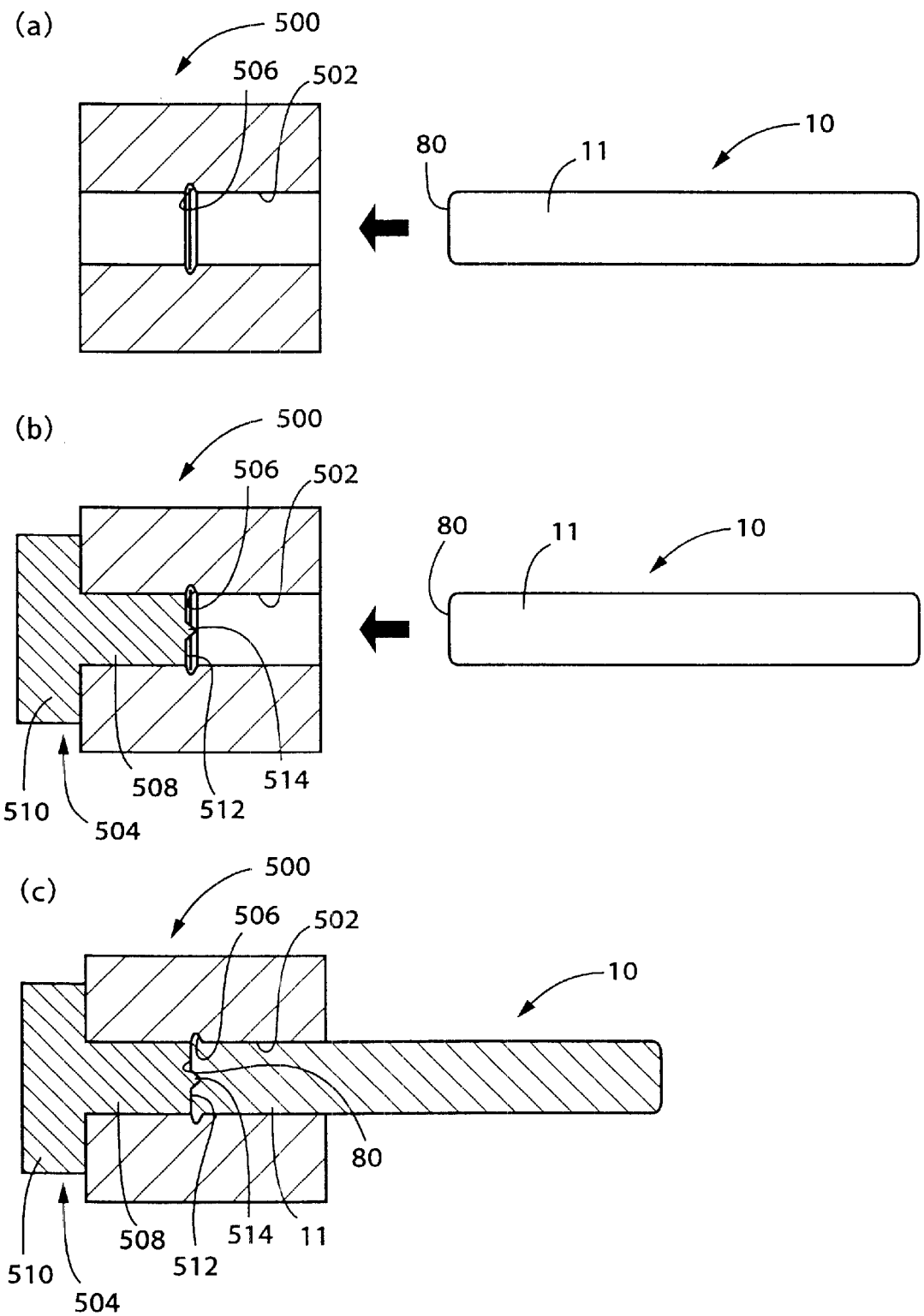
FIG. 15 is cross-sectioned, side elevation views for explaining steps of press-fitting of two members in an inertia-press-fit method as a ninth embodiment of the present invention.

FIG. 15 shows a second member 500 which has a fitting hole 502 in the form of a through-hole which is formed through the thickness of the second member 500. In this case, it is advantageous to employ a stopper member 504 which defines a press-fit-end position of the first member 10. As shown in FIG. 15(*a*), the second member 500 has a large-diameter annular groove 506 which is formed, at a position corresponding to the press-fit-end position of an end surface 80 of the first member 10, in an inner circumferential surface of the fitting hole 502. The annular groove has a diameter larger than that of the remaining portion of the inner circumferential surface of the fitting hole 502. As shown in FIG. 15(*b*), the stopper member 504 is inserted in one of two end openings of the fitting hole 502 that is opposite to the other end opening in which the first member 10 is to be press-fitted. The stopper member 504 has a stepped cylindrical shape including a small-diameter portion 508 and a flange portion 510, and the small-diameter portion 508 is fitted into the fitting hole 502 of the second member 500 till the flange portion 510 contacts an end surface of the second member 500. The flange portion 510 is supported by a support member (not shown). A butting projection 514 like the butting projection 306 shown in FIG. 13 is formed on a central portion of an end surface 512 of the small-diameter portion 508. When kinetic energy is applied to the first member 10 in a direction which causes the member 10 to approach the second member 500, the end surface 80 of the fitting projecting portion 11 of the first member 10 butts the butting projection 514 of the stopper member 504, as shown in FIG. 15(*c*), so that the end portion of the projecting portion 11 is plastically deformed, the excessive kinetic energy is absorbed, and the outward expanded portion of the end portion engages the annular groove 506 of the second member 500.

Figure 16:
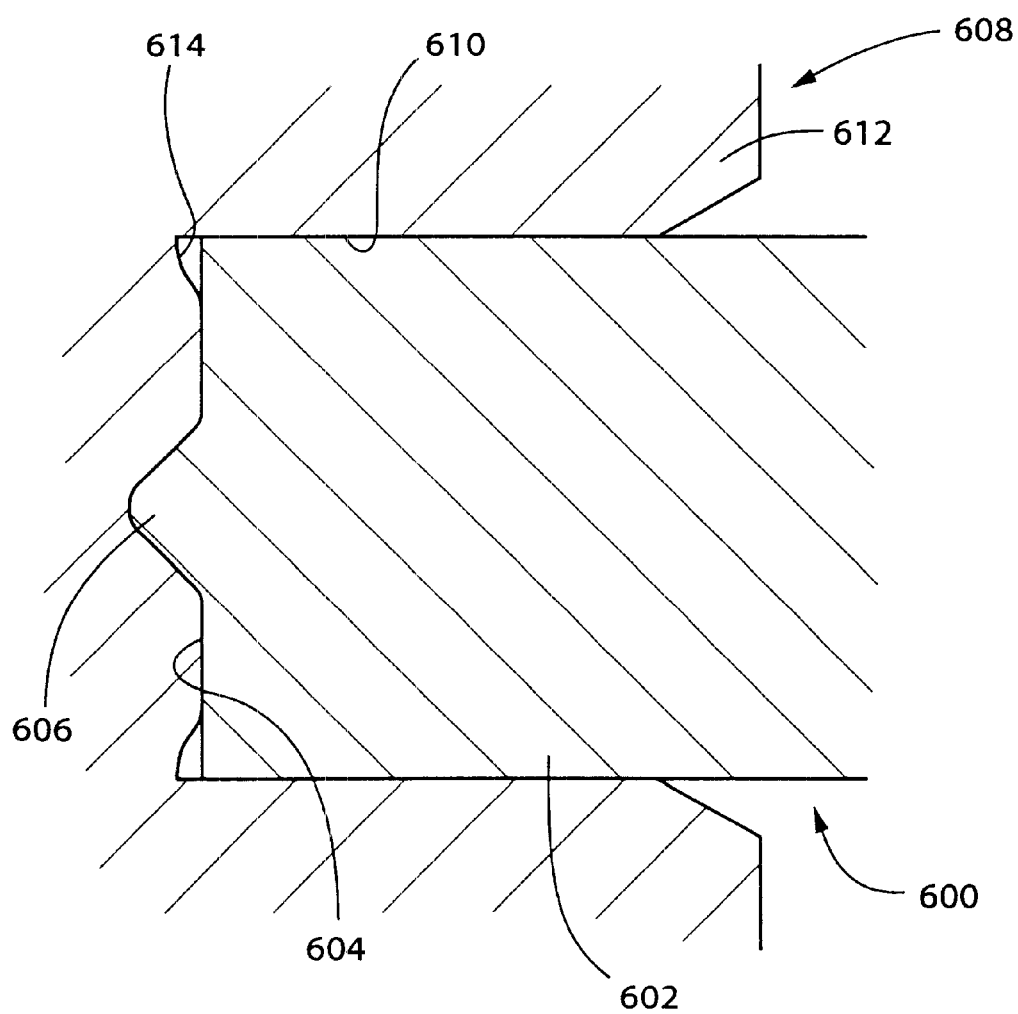
FIG. 16 is an enlarged view of a press-fit assembly, cross-sectioned along an axis line thereof, which is obtained in an inertia-press-fit method as a tenth embodiment of the present invention.

A butting projection may be formed on a first member. For example, FIG. 16 shows a first member 600 which has a butting projection 606 formed on an end surface 604 of a fitting projecting portion 602 thereof. The butting projection 606 is like the butting projection 306. A second member 608 has a fitting hole 610 formed with a bottom at the center of an end surface thereof. A portion of the second member 608 that defines the fitting hole 610 provides a fitting recessed portion 612 of the second member 608. A bottom surface 614 of the fitting hole 610 has a hardness lower than that of at least the butting projection 606 of the projecting portion 602. When the first member 600 is press-fitted in the second member 608, the butting projection 606 of the projecting portion 602 bites into the bottom surface 614 of the fitting hole 610, thereby plastically deforming the bottom surface 614 and its vicinity, so that the thus risen portion of the bottom surface 614 and the end surface 604 of the projecting portion 602 are brought into close contact with each other, the excessive kinetic energy is absorbed, and the press-fit-end position of the first and second members 600, 608 is determined.

As is apparent from the foregoing description, each of the embodiments (the seventh and eighth embodiments) shown in FIGS. 13 and 14 corresponds to one embodiment of the present invention that is recited in claims 18 and 20; and the embodiment (the ninth embodiment) shown in FIG. 15 corresponds to one embodiment of the present invention. The embodiment (the tenth embodiment) shown in FIG. 16 corresponds to one embodiment of the present invention that is recited in claim 22. The end surface 80 of the fitting projecting portion 11 or the bottom surface 614 of the second member 600 provides the butting portion. In addition, the stopper member 504 provides the third member. Moreover, the annular groove 308, 410, 506 is an example of the undercut recited in claim 22. However, the undercut may have any shape such as a partly formed recess such as a petal-shaped recess.

While the present invention has been described in detail in its several embodiments by reference to the drawings, it is to be understood that the present invention may be embodied with other changes and improvements that may occur to one skilled in the art.

What is claimed is:

1. An inertia-press-fit method of applying a kinetic energy to at least one of two members in a direction which causes the two members to approach each other, and press-fitting the two members with each other, characterized by
causing the two members to butt each other to define a relative position of the two members at a time when the press-fitting ends and, immediately after the butting, causing at least one of the two members to plastically deform and thereby absorb a remaining kinetic energy of said one member.

2. An inertia-press-fit method according to claim 1, wherein said one member which plastically deforms includes a butting portion which butts the other member, and an interference-fitting portion which interference-fits with the other member, the butting portion being more plastically deformable than the interference-fitting portion.

3. An inertia-press-fit method according to claim 2, wherein the butting portion of said at least one of the two members has a Vickers hardness Hv smaller than that of the interference-fitting portion thereof.

4. An inertia-press-fit method according to claim 1, wherein the two members include respective butting portions which butt each other, at least one of the butting portions having a shape which allows a material thereof to flow and thus plastically deform.

5. An inertia-press-fit method according to claim 1, wherein the two members are caused to butt each other at a stopper surface inclined relative to a plane perpendicular to said direction, to define the relative position of the two members at the time when the press-fitting ends.

6. An inertia-press-fit method according to claim 1, wherein one of the two members is a torsion bar which is used in a power steering device of an automotive vehicle and the other member is a shaft which is used in the power steering device and which is press-fitted in the torsion bar, and wherein the torsion bar includes a butting portion which butts the shaft and which has a Vickers hardness Hv not greater than about 450 and the shaft includes a butting portion which butts the torsion bar and which has a Vickers hardness Hv not greater than about 300.

7. An inertia-press-fit method according to claim 1, wherein one of the two members includes a fitting recessed portion having a fitting hole with a bottom surface and the other member includes a fitting projecting portion which is interference-fitted in the fitting hole, and wherein the fitting projecting portion is press-fitted in the fitting hole to butt the bottom surface thereof.

8. An inertia-press-fit method according to claim 7, wherein the fitting projecting portion has an end surface and a projection which projects from the end surface and which has a diameter smaller than that of the fitting projecting portion, and wherein the projection is caused to butt the bottom surface of the fitting hole.

9. An inertia-press-fit method according to claim 8, wherein the bottom surface of the fitting recessed portion has a recess formed in a central portion thereof, and wherein an outer peripheral portion of the projection is caused to butt a portion of the bottom surface that surrounds the recess.

10. An inertia-press-fit method according to claim 8, wherein the bottom surface of the fitting recessed portion has a conical recess formed in a central portion thereof, and wherein an outer peripheral portion of the projection is caused to butt a conical surface of the conical recess.

11. An inertia-press-fit method according to claim 1, wherein the plastic deformation is caused such that a maximal value of a rebound-caused deviation amount of an actual press-fit-end position from a normal press-fit-end position where the two members are in close contact with each other is not greater than a reference amount.

12. An inertia-press-fit method according to claim 1, wherein one of the two members includes a fitting recessed portion and the other member includes a fitting projecting portion which is press-fitted in the fitting recessed portion, at least the fitting projecting portion being subjected to the plastic deformation, and wherein the two members are press-fitted with each other in a deviation-amount-increase-rate decrease range in which a rate of increase of a rebound-caused deviation amount of an actual press-fit-end position from a reference press-fit-end position where the two members are in close contact with each other decreases as the kinetic energy increases.

13. An inertia-press-fit method according to claim 1, wherein one of the two members includes a fitting recessed portion and the other member includes a fitting projecting portion which is press-fitted in the fitting recessed portion, at least the fitting projecting portion being subjected to the plastic deformation, and wherein the two members are press-fitted with each other in a deviation-amount decrease range in which a rebound-caused deviation amount of an actual press-fit-end position from a normal press-fit-end position where the two members are in close contact with each other decreases as the kinetic energy increases.

14. An inertia-press-fit method according to claim 13, wherein the two members are press-fitted with each other in said deviation-amount decrease range and simultaneously in a range in which said rebound-caused deviation amount is not greater than a reference amount.

15. An inertia-press-fit method according to claim 1, wherein, at at least an initial phase of the butting of the two members, a butting projection and a butting portion which is less harder than the butting projection butt each other, so that the butting projection bites into the butting portion.

16. An inertia-press-fit method according to claim 15, wherein one of the two members includes a fitting recessed portion having a fitting hole with a bottom surface and the other member includes a fitting projecting portion which is interference-fitted in the fitting hole, and wherein said butting projection comprises a butting projection projecting from a portion of the bottom surface of the fitting hole and said butting portion comprises an end surface of the fitting projecting portion.

17. An inertia-press-fit method according to claim 16, wherein the fitting recessed portion has an undercut which is formed in a portion of an inner circumferential surface of the fitting hole that is near the bottom surface, and whose diameter is greater than that of a remaining portion of the inner circumferential surface, and wherein when the butting projection bites into the end surface of the fitting projecting portion, an end portion of the fitting projecting portion is forced to expand outward and thereby engage the undercut of the fitting recessed portion.

18. An inertia-press-fit method according to claim 15, wherein one of the two members includes a fitting recessed portion having a fitting hole with a bottom surface and the other member includes a fitting projecting portion which is interference-fitted in the fitting hole, and wherein the butting projection comprises a hard member which is provided between the bottom surface of the fitting hole and an end surface of the fitting projecting portion and which is harder than at least one of the bottom surface and the end surface.

19. An inertia-press-fit method according to claim 18, wherein the hard member is a steel ball.

20. An inertia-press-fit method according to claim 15, wherein one of the two members includes a fitting recessed portion having a fitting hole with a bottom surface and the other member includes a fitting projecting portion which is interference-fitted in the fitting hole, and wherein said butting projection comprises a butting projection projecting from a portion of an end surface of the fitting projecting portion and said butting portion comprises the bottom surface of the fitting hole, the butting projection being caused to bite into the bottom surface of the fitting hole.

21. An inertia-press-fit method of applying a kinetic energy to at least one of two members in a direction which causes the two members to approach each other, and press-fitting the two members with each other, characterized by causing the two members to butt each other via a buffer member to define a relative position of the two members at a time when the press-fitting ends and, immediately after the butting of the two members via the buffer member, causing the buffer member to plastically deform and thereby absorb a remaining kinetic energy of said one member.

22. An inertia-press-fit method according to claim 21, wherein the plastic deformation is caused such that a maximal value of a rebound-caused deviation amount of an actual press-fit-end position from a normal press-fit-end position where the two members are in close contact with each other is not greater than a reference amount.

23. An inertia-press-fit method according to claim 21, wherein one of the two members includes a fitting recessed portion and the other member includes a fitting projecting portion which is press-fitted in the fitting recessed portion, the buffer member having an outer diameter smaller than that of the fitting projecting portion, and wherein the two members are press-fitted with each other in a deviation-amount decrease range in which a rebound-caused deviation amount of an actual press-fit-end position from a normal press-fit-end position where the two members are in close contact with each other decreases as the kinetic energy increases.

* * * * *